United States Patent
Lee et al.

(10) Patent No.: US 12,446,474 B2
(45) Date of Patent: Oct. 14, 2025

(54) MAGNETIC MEMORY DEVICES

(71) Applicant: Samsung Electronics Co., Ltd., Suwon-si (KR)

(72) Inventors: Joonmyoung Lee, Gwacheon-si (KR); Junghwan Park, Seoul (KR); Jeong-Heon Park, Hwaseong-si (KR); Kyungil Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 604 days.

(21) Appl. No.: 17/817,441

(22) Filed: Aug. 4, 2022

(65) Prior Publication Data
US 2023/0180625 A1 Jun. 8, 2023

(30) Foreign Application Priority Data
Dec. 7, 2021 (KR) .......................... 10-2021-0174149

(51) Int. Cl.
*H10N 50/80* (2023.01)
*H10B 61/00* (2023.01)
*H10N 50/01* (2023.01)

(52) U.S. Cl.
CPC ............ *H10N 50/80* (2023.02); *H10B 61/00* (2023.02); *H10N 50/01* (2023.02)

(58) Field of Classification Search
None
See application file for complete search history.

(56) References Cited

U.S. PATENT DOCUMENTS

| | | | |
|---|---|---|---|
| 7,742,263 B2 | 6/2010 | Fukumoto et al. | |
| 8,897,060 B2 | 11/2014 | Nakayama et al. | |
| 9,362,486 B2 | 6/2016 | Kim et al. | |
| 9,640,584 B2 | 5/2017 | Nagamine et al. | |
| 9,825,220 B2 | 11/2017 | Apalkov et al. | |
| 10,062,732 B2 | 8/2018 | Apalkov et al. | |
| 11,050,014 B2 | 6/2021 | Park et al. | |
| 2011/0031569 A1* | 2/2011 | Watts | G01R 33/098 |
| | | | 257/E29.323 |
| 2011/0064969 A1* | 3/2011 | Chen | B82Y 25/00 |
| | | | 428/800 |
| 2013/0075839 A1 | 3/2013 | Chen et al. | |
| 2014/0021426 A1* | 1/2014 | Lee | G11C 11/161 |
| | | | 257/1 |
| 2016/0301000 A1* | 10/2016 | Kim | H10N 50/80 |
| 2017/0194555 A1* | 7/2017 | Lee | H10N 50/10 |
| 2018/0190898 A1 | 7/2018 | Wang et al. | |
| 2020/0266334 A1 | 8/2020 | Guisan et al. | |
| 2022/0320418 A1 | 10/2022 | Kim et al. | |

* cited by examiner

*Primary Examiner* — Bilkis Jahan
(74) *Attorney, Agent, or Firm* — Wolf, Greenfield & Sacks, P.C.

(57) ABSTRACT

A magnetic memory device includes a first magnetic pattern and a second magnetic pattern that are sequentially stacked on a substrate, a tunnel barrier pattern between the first magnetic pattern and the second magnetic pattern, a lower electrode between the substrate and the first magnetic pattern, a blocking pattern between the lower electrode and the first magnetic pattern, a metal oxide pattern between the blocking pattern and the first magnetic pattern, and a buffer pattern between the metal oxide pattern and the first magnetic pattern. The lower electrode, the blocking pattern, the metal oxide pattern, and the buffer pattern include first, second, third, and fourth non-magnetic metals, respectively. The metal oxide pattern has an amorphous phase.

19 Claims, 19 Drawing Sheets

MAGNETIC MEMORY DEVICES

CROSS-REFERENCE TO RELATED APPLICATION(S)

This U.S. non-provisional patent application claims priority under 35 U.S.C. § 119 to Korean Patent Application No. 10-2021-0174149, filed on Dec. 7, 2021, in the Korean Intellectual Property Office, the entire contents of which are hereby incorporated by reference.

BACKGROUND

The present disclosure relates to magnetic memory devices. As demand for high-speed and/or low power consumption electronic devices has increased, demand for high-speed and/or low-voltage semiconductor memory devices used therein has also increased. Magnetic memory devices have been developed as semiconductor memory devices that attempt to meet these demands. Magnetic memory devices may emerge as next-generation semiconductor memory devices because of their high-speed and/or non-volatile characteristics.

In general, a magnetic memory device may include a magnetic tunnel junction (MTJ) pattern. The magnetic tunnel junction pattern may include two magnetic layers and an insulating layer disposed between the two magnetic layers. A resistance value of the magnetic tunnel junction pattern may be changed depending on magnetization directions of the two magnetic layers. For example, the magnetic tunnel junction pattern may have a relatively high resistance value when the magnetization directions of the two magnetic layers are antiparallel to each other, and the magnetic tunnel junction pattern may have a relatively low resistance value when the magnetization directions of the two magnetic layers are parallel to each other. The magnetic memory device may write/read data using a difference between the resistance values of the magnetic tunnel junction pattern.

As the electronics industry has become highly developed, highly integrated and/or low power consumption magnetic memory devices have been increasingly demanded and techniques for improving reliability of magnetic memory devices have been variously studied.

SUMMARY

Embodiments of the inventive concepts may provide a magnetic memory device capable of improving resistance characteristics and switching distribution of a magnetic tunnel junction pattern and a method of manufacturing the same.

Embodiments of the inventive concepts may also provide a magnetic memory device capable of improving high-temperature reliability and a method of manufacturing the same.

In an aspect, a magnetic memory device may include a first magnetic pattern and a second magnetic pattern that are sequentially stacked on a substrate, a tunnel barrier pattern between the first magnetic pattern and the second magnetic pattern, a lower electrode between the substrate and the first magnetic pattern, a blocking pattern between the lower electrode and the first magnetic pattern, a metal oxide pattern between the blocking pattern and the first magnetic pattern, and a buffer pattern between the metal oxide pattern and the first magnetic pattern. The lower electrode, the blocking pattern, the metal oxide pattern, and the buffer pattern may include first, second, third, and fourth non-magnetic metals, respectively. The metal oxide pattern may have an amorphous phase.

In an aspect, a magnetic memory device may include a first magnetic pattern and a second magnetic pattern that are sequentially stacked on a substrate, a tunnel barrier pattern between the first magnetic pattern and the second magnetic pattern, a lower electrode between the substrate and the first magnetic pattern, a metal oxide pattern between the lower electrode and the first magnetic pattern, a buffer pattern between the metal oxide pattern and the first magnetic pattern, and a seed pattern between the buffer pattern and the first magnetic pattern. Each of the metal oxide pattern, the buffer pattern and the seed pattern may include a respective non-magnetic metal. The metal oxide pattern may have an amorphous phase.

A magnetic memory device, according to some embodiments, may include a substrate and lower and upper electrodes on the substrate. The lower electrode may be between the upper electrode and the substrate. The magnetic memory device may include first and second magnetic layers on the substrate. The first magnetic layer may be between the lower electrode and the second magnetic layer. The magnetic memory device may include a tunnel barrier layer between the first and second magnetic layers. Moreover, the magnetic memory device may include a non-crystalline metal oxide layer between the lower electrode and the first magnetic layer.

DETAILED DESCRIPTION

Example embodiments of the inventive concepts will now be described more fully with reference to the accompanying drawings.

Figure 1:
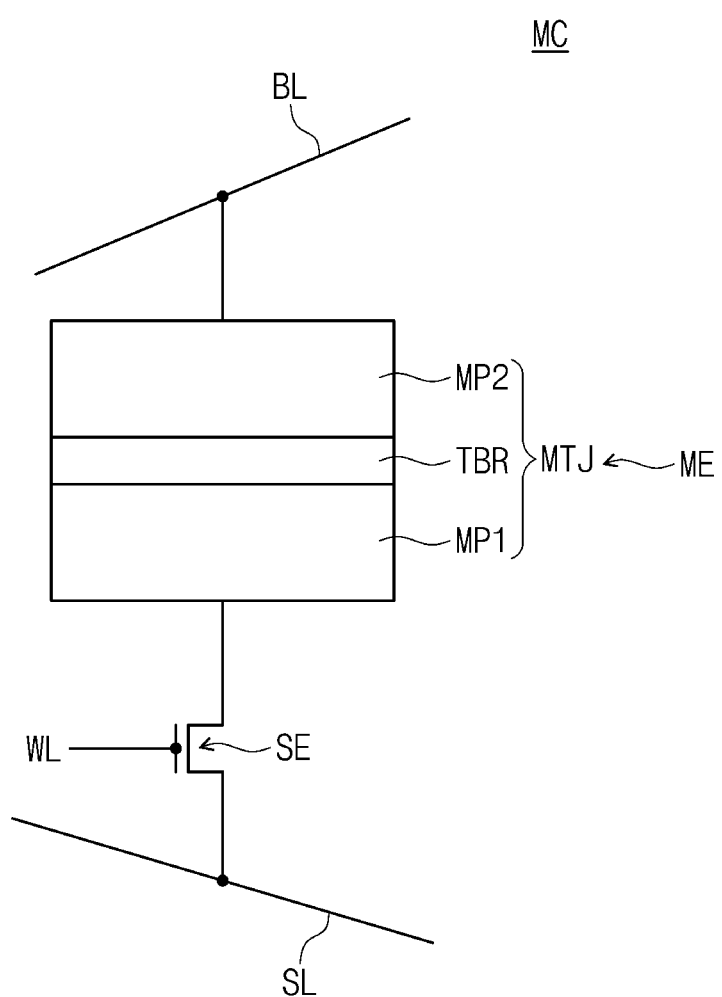
FIG. 1 is a circuit diagram illustrating a unit memory cell of a magnetic memory device according to some embodiments of the inventive concepts.

FIG. 1 is a circuit diagram illustrating a unit memory cell of a magnetic memory device according to some embodiments of the inventive concepts.

Referring to FIG. 1, a unit memory cell MC may include a memory element ME and a selection element SE. The memory element ME and the selection element SE may be electrically connected in series to each other. The memory element ME may be connected (e.g., electrically connected) between a bit line BL and the selection element SE. The selection element SE may be connected (e.g., electrically connected) between the memory element ME and a source line SL and may be controlled by a word line WL. For example, the selection element SE may include a bipolar transistor or a metal-oxide semiconductor (MOS) field effect transistor.

The memory element ME may include a magnetic tunnel junction pattern MTJ, and the magnetic tunnel junction pattern MTJ may include a first magnetic pattern MP1, a second magnetic pattern MP2, and a tunnel barrier pattern TBR between the first and second magnetic patterns MP1 and MP2. One of the first and second magnetic patterns MP1 and MP2 may be a pinned magnetic pattern of which a magnetization direction is fixed in one direction regardless of an external magnetic field under a general use environment. The other of the first and second magnetic patterns MP1 and MP2 may be a free magnetic pattern of which a magnetization direction is changeable between two stable magnetization directions by an external magnetic field. An electrical resistance of the magnetic tunnel junction pattern MTJ when the magnetization directions of the pinned and free magnetic patterns are antiparallel to each other may be much greater than that of the magnetic tunnel junction pattern MTJ when the magnetization directions of the pinned and free magnetic patterns are parallel to each other. In other words, the electrical resistance of the magnetic tunnel junction pattern MTJ may be adjusted by changing the magnetization direction of the free magnetic pattern. Thus, logical data may be stored in the memory element ME of the unit memory cell MC by using an electrical resistance difference according to the magnetization directions of the pinned and free magnetic patterns.

Figure 2:
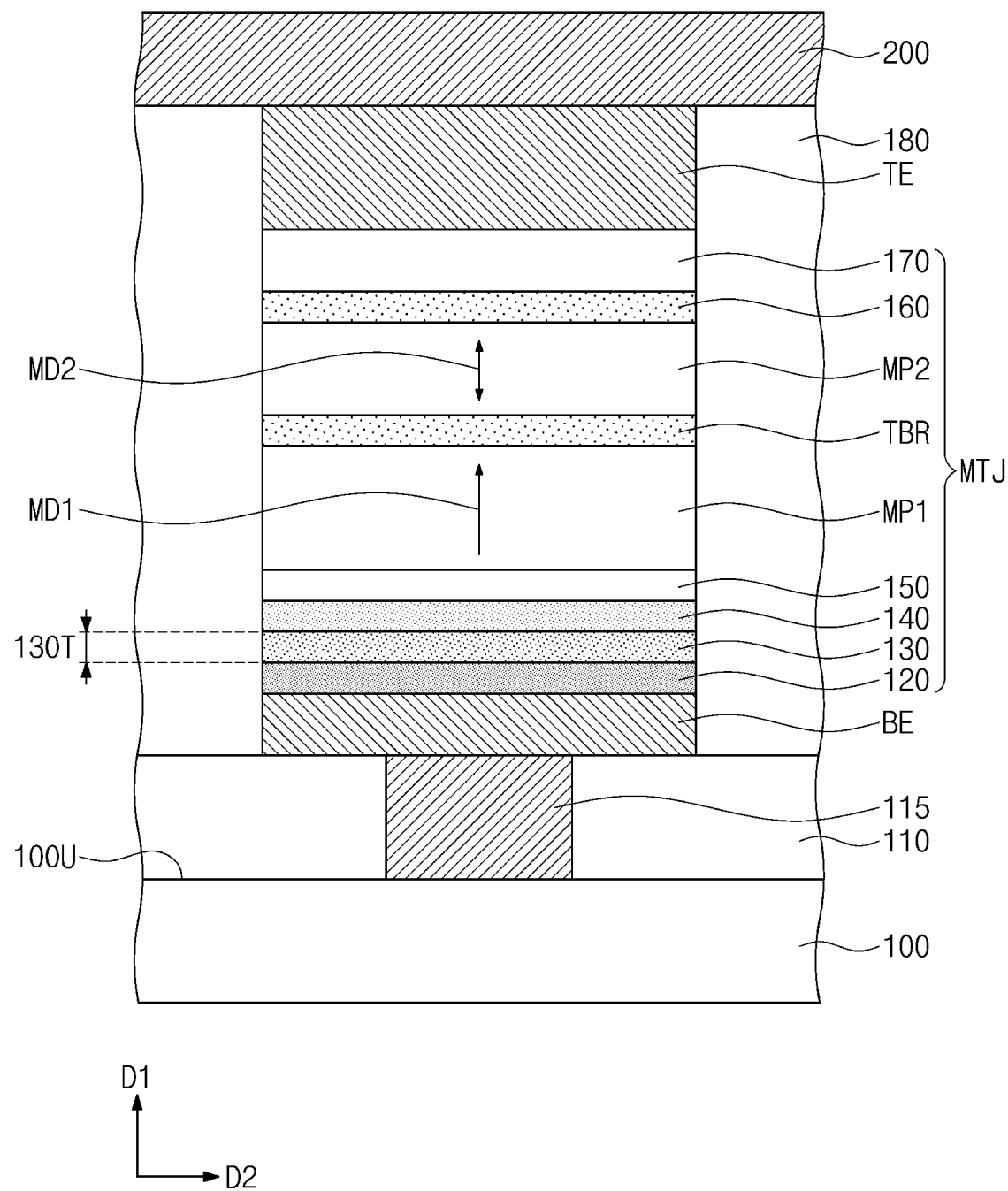
FIG. 2 is a cross-sectional view illustrating a magnetic memory device according to some embodiments of the inventive concepts.

FIG. 2 is a cross-sectional view illustrating a magnetic memory device according to some embodiments of the inventive concepts.

Referring to FIG. 2, a first interlayer insulating layer 110 may be disposed on a substrate 100, and a lower contact plug 115 may be disposed in the first interlayer insulating layer 110. The substrate 100 may be a semiconductor substrate including silicon (Si), silicon-on-insulator (SOI), silicon-germanium (SiGe), germanium (Ge), or gallium-arsenide (GaAs). For example, the first interlayer insulating layer 110 may include at least one of silicon oxide, silicon nitride, or silicon oxynitride.

The lower contact plug 115 may extend through (e.g., penetrate) the first interlayer insulating layer 110 and may be electrically connected to the substrate 100. A selection element (e.g., the selection element SE of FIG. 1) may be disposed in the substrate 100. The selection element may be, for example, a field effect transistor. The lower contact plug 115 may be electrically connected to one terminal (e.g., a source/drain terminal) of the selection element. The lower contact plug 115 may include at least one of a doped semiconductor material (e.g., doped silicon), a metal (e.g., tungsten, titanium, and/or tantalum), a metal-semiconductor compound (e.g., a metal silicide), or a conductive metal nitride (e.g., titanium nitride (TiN), tantalum nitride (TaN), and/or tungsten nitride (WN)).

A lower electrode BE, a magnetic tunnel junction pattern MTJ and an upper electrode TE may be sequentially stacked on the lower contact plug 115 in a first direction D1 perpendicular to a top surface 100U of the substrate 100. The lower electrode BE may be disposed between the lower contact plug 115 and the magnetic tunnel junction pattern MTJ, and the magnetic tunnel junction pattern MTJ may be disposed between the lower electrode BE and the upper electrode TE. The lower electrode BE may be electrically connected to the lower contact plug 115. The upper electrode TE may include at least one of a metal (e.g., tantalum (Ta), tungsten (W), ruthenium (Ru), or iridium (Ir)) or a conductive metal nitride (e.g., TiN). The lower electrode BE may be between the upper electrode TE and the substrate 100.

The magnetic tunnel junction pattern MTJ may include a first magnetic pattern MP1, a second magnetic pattern MP2, a tunnel barrier pattern TBR between the first magnetic pattern MP1 and the second magnetic pattern MP2, a blocking pattern 120 between the lower electrode BE and the first magnetic pattern MP1, a metal oxide pattern 130 between the blocking pattern 120 and the first magnetic pattern MP1, a buffer pattern 140 between the metal oxide pattern 130 and the first magnetic pattern MP1, and a seed pattern 150 between the buffer pattern 140 and the first magnetic pattern MP1. The first magnetic pattern MP1 may be between the lower electrode BE and the second magnetic pattern MP2.

The lower electrode BE may include a first non-magnetic metal and may include a nitride of the first non-magnetic metal. For example, the first non-magnetic metal may be at least one of tantalum (Ta), titanium (Ti), silicon (Si), or tungsten (W). For example, the lower electrode BE may include TaN, TiN, silicon nitride (SiN), or WN.

The blocking pattern 120 may include a second non-magnetic metal and may include a boride of the second non-magnetic metal. For example, the second non-magnetic metal may be at least one of tantalum (Ta), hafnium (Hf), zirconium (Zr), titanium (Ti), tungsten (W), niobium (Nb), chromium (Cr), molybdenum (Mo), aluminum (Al), ruthenium (Ru), or vanadium (V). For example, the blocking pattern 120 may include tantalum boride (TaB). In some embodiments, the blocking pattern 120 may further include a ferromagnetic element, and the ferromagnetic element may be at least one of cobalt (Co), iron (Fe), or nickel (Ni). For example, the blocking pattern 120 may include CoFeBTa. At least a portion of the blocking pattern 120 may have an amorphous phase (i.e., may be non-crystalline).

The metal oxide pattern 130 may include a third non-magnetic metal and may include an oxide of the third non-magnetic metal. The metal oxide pattern 130 may have an amorphous phase. For example, the metal oxide pattern 130 may comprise an amorphous (i.e., non-crystalline) metal oxide layer. The third non-magnetic metal may be different from the first non-magnetic metal and the second non-magnetic metal. An oxide formation energy of the first non-magnetic metal and an oxide formation energy of the second non-magnetic metal may be higher than an oxide formation energy of the third non-magnetic metal. In other words, the oxide formation energy of the third non-magnetic metal may be lower than the oxide formation energy of the first non-magnetic metal and the oxide formation energy of the second non-magnetic metal. In the present specification, an oxide formation energy may be defined as a value obtained by subtracting an energy of a reactant from an energy of an oxide corresponding to a product (i.e., Eoxide formation=Eproducts−Ereactants), formation of the oxide may become easier as the oxide formation energy decreases, and formation of the oxide may become more difficult as the oxide formation energy increases. In other words, the third non-magnetic metal may more easily react with oxygen than the first non-magnetic metal and the second non-magnetic metal and may be more easily oxidized than the first non-magnetic metal and the second non-magnetic metal. A reactivity of the third non-magnetic metal to oxygen may be higher than those of the first non-magnetic metal and the second non-magnetic metal to oxygen. For example, the third non-magnetic metal may be at least one of hafnium (Hf), zirconium (Zr), strontium (Sr), scandium (Sc), yttrium (Y), calcium (Ca), beryllium (Be), barium (Ba), titanium (Ti), tantalum (Ta), niobium (Nb), or vanadium (V). For example, the metal oxide pattern 130 may include hafnium oxide (HfOx).

The buffer pattern 140 may include a fourth non-magnetic metal and may be a metal pattern comprising (e.g., made of) the fourth non-magnetic metal. The buffer pattern 140 may have a crystalline phase. The fourth non-magnetic metal may be different from the third non-magnetic metal. An oxide formation energy of the fourth non-magnetic metal may be higher than the oxide formation energy of the third non-magnetic metal. In other words, the oxide formation energy of the third non-magnetic metal may be lower than the oxide formation energy of the fourth non-magnetic metal. The third non-magnetic metal may more easily react with oxygen than the fourth non-magnetic metal and may be more easily oxidized than the fourth non-magnetic metal. The reactivity of the third non-magnetic metal to oxygen may be higher than that of the fourth non-magnetic metal to oxygen. For example, the fourth non-magnetic metal may be at least one of tantalum (Ta), tungsten (W), niobium (Nb), chromium (Cr), molybdenum (Mo), aluminum (Al), ruthenium (Ru), or vanadium (V). For example, the buffer pattern 140 may be a metal pattern comprising (e.g., made of) Ta.

The seed pattern 150 may include a material capable of assisting crystal growth of the first magnetic pattern MP1. For example, the seed pattern 150 may include at least one of chromium (Cr), iridium (Ir), ruthenium (Ru), or rhenium (Re).

At least a portion of the blocking pattern 120 and the metal oxide pattern 130 may have the amorphous phase. The blocking pattern 120 and the metal oxide pattern 130 may inhibit/prevent a crystal structure of the lower electrode BE from being transferred to the seed pattern 150, and thus it is possible to inhibit/prevent the crystal structure of the lower electrode BE from affecting a crystal structure and orientation of the first magnetic pattern MP1 through the seed pattern 150. The buffer pattern 140 may have the crystalline phase and may increase crystallinity of the seed pattern 150. Thus, deterioration of crystallinity of the first magnetic pattern MP1 may be inhibited/prevented.

In addition, the oxide formation energy of the third non-magnetic metal of the metal oxide pattern 130 may be lower than the oxide formation energy of the first non-magnetic metal of the lower electrode BE, the oxide formation energy of the second non-magnetic metal of the blocking pattern 120 and the oxide formation energy of the fourth non-magnetic metal of the buffer pattern 140. In other words, the third non-magnetic metal may more easily react with oxygen than the first non-magnetic metal, the second non-magnetic metal and the fourth non-magnetic metal and may have high reactivity to oxygen. Thus, it is possible to inhibit oxygen in the metal oxide pattern 130 from being diffused into adjacent layers during a subsequent high-temperature process.

Since deterioration of the crystallinity of the first magnetic pattern MP1 is inhibited and diffusion of oxygen in the magnetic tunnel junction pattern MTJ is inhibited, it is possible to reduce/minimize deterioration of resistance characteristics and switching distribution of the magnetic tunnel junction pattern MTJ.

The metal oxide pattern 130 may have a thickness 130T in the first direction D1, and, for example, the thickness 130T of the metal oxide pattern 130 may range from 1 angstrom (Å) to 30 Å. In some embodiments, for example, the thickness 130T of the metal oxide pattern 130 may range from 1 Å to 10 Å. If the thickness 130T of the metal oxide pattern 130 is greater than 30 Å, a resistance of the magnetic tunnel junction pattern MTJ may be increased. Since the metal oxide pattern 130 is formed with a relatively thin thickness, an increase in resistance of the magnetic tunnel junction pattern MTJ may be inhibited/prevented.

The first magnetic pattern MP1 may be a pinned magnetic pattern having a magnetization direction MD1 fixed in one direction, and the second magnetic pattern MP2 may be a free magnetic pattern having a changeable magnetization direction MD2. The magnetization direction MD2 of the second magnetic pattern MP2 may be changeable to be parallel or antiparallel to the magnetization direction MD1 of the first magnetic pattern MP1. FIG. 2 illustrates a case in which the first magnetic pattern MP1 is the pinned magnetic pattern and the second magnetic pattern MP2 is the free magnetic pattern, but embodiments of the inventive concepts are not limited thereto. Unlike FIG. 2, the first magnetic pattern MP1 may be the free magnetic pattern, and the second magnetic pattern MP2 may be the pinned magnetic pattern.

The magnetization directions MD1 and MD2 of the first and second magnetic patterns MP1 and MP2 may be substantially perpendicular to an interface between the first magnetic pattern MP1 and the tunnel barrier pattern TBR and may be substantially perpendicular to the top surface 100U of the substrate 100. In this case, each of the first and second magnetic patterns MP1 and MP2 may include at least one of an intrinsic perpendicular magnetic material or an extrinsic perpendicular magnetic material. The intrinsic perpendicular magnetic material may include a material which has a perpendicular magnetization property even though an external factor does not exist. The intrinsic perpendicular magnetic material may include at least one of a perpendicular magnetic material (e.g., CoFeTb, CoFeGd, or CoFeDy), a perpendicular magnetic material having a $L2_0$ structure, a CoPt alloy having a hexagonal close packed (HCP) lattice structure, or a perpendicular magnetic structure. The perpendicular magnetic material having the $L1_0$ structure may include at least one of FePt having the $L1_0$ structure, FePd having the $L1_0$ structure, CoPd having the $L1_0$ structure, or CoPt having the $L1_0$ structure. The perpendicular magnetic structure may include magnetic layers and non-magnetic layers, which are alternately and repeatedly stacked. For example, the perpendicular magnetic structure may include at least one of (Co/Pt)n, (CoFe/Pt)n, (CoFe/Pd)n, (Co/Pd)n, (Co/Ni)n, (CoNi/Pt)n, (CoCr/Pt)n, or (CoCr/Pd)n, where denotes the number of bilayers. The extrinsic perpendicular magnetic material may include a material which has an intrinsic horizontal magnetization property but has a perpendicular magnetization property by an external factor. For example, the extrinsic perpendicular magnetic material may have the perpendicular magnetization property due to magnetic anisotropy induced by a junction of the first magnetic pattern MP1 (or the second magnetic pattern MP2) and the tunnel barrier pattern TBR. The extrinsic perpendicular magnetic material may include, for example, CoFeB. In some embodiments, the first magnetic pattern MP1 may be the pinned magnetic pattern including the intrinsic perpendicular magnetic material, and the second magnetic pattern MP2 may be the free magnetic pattern including the extrinsic perpendicular magnetic material (e.g., CoFeB).

In certain embodiments, each of the first magnetic pattern MP1 and the second magnetic pattern MP2 may include a Co-based Heusler alloy. The tunnel barrier pattern TBR may include at least one of a magnesium (Mg) oxide layer, a titanium (Ti) oxide layer, an aluminum (Al) oxide layer, a magnesium-zinc (Mg—Zn) oxide layer, or a magnesium-boron (Mg—B) oxide layer.

The magnetic tunnel junction pattern MTJ may further include a capping pattern 170 between the second magnetic pattern MP2 and the upper electrode TE, and a non-magnetic pattern 160 between the second magnetic pattern MP2 and the capping pattern 170. The non-magnetic pattern 160 may include at least one of a magnesium (Mg) oxide layer, a titanium (Ti) oxide layer, an aluminum (Al) oxide layer, a magnesium-zinc (Mg—Zn) oxide layer, or a magnesium-boron (Mg—B) oxide layer. For example, the non-magnetic pattern 160 may include the same material as the tunnel barrier pattern TBR. The magnetic anisotropy of the second magnetic pattern MP2 may be improved by magnetic anisotropy induced at an interface between the non-magnetic pattern 160 and the second magnetic pattern MP2. The capping pattern 170 may be used to inhibit/prevent deterioration of the second magnetic pattern MP2. For example, the capping pattern 170 may include at least one of tantalum (Ta), ruthenium (Ru), molybdenum (Mo), aluminum (Al), copper (Cu), gold (Au), silver (Ag), titanium (Ti), tantalum nitride (TaN), or titanium nitride (TiN). In some embodiments, each of the seed pattern 150 and the capping pattern 170 may include a non-magnetic metal.

A second interlayer insulating layer 180 may be disposed on the first interlayer insulating layer 110 and may be on (e.g., may cover) side surfaces of the lower electrode BE, the magnetic tunnel junction pattern MTJ and the upper electrode TE. For example, the second interlayer insulating layer 180 may include silicon oxide, silicon nitride, and/or silicon oxynitride.

An upper interconnection line 200 may be disposed on the second interlayer insulating layer 180 and may be connected (e.g., electrically connected) to the upper electrode TE. The upper interconnection line 200 may extend in a second direction D2 parallel to the top surface 100U of the substrate 100. The upper interconnection line 200 may be connected (e.g., electrically connected) to the magnetic tunnel junction pattern MTJ through the upper electrode TE and may be/function as the bit line BL of FIG. 1. The upper interconnection line 200 may include at least one of a metal (e.g., copper) or a conductive metal nitride.

When a high-temperature process of 400° C. or more is performed on a magnetic tunnel junction pattern MTJ that does not include the blocking pattern 120, the metal oxide pattern 130 and/or the buffer pattern 140, the crystallinity of the lower electrode BE may be transferred to layers (e.g., the seed pattern 150 and the first magnetic pattern MP1) disposed thereon. In this case, crystallinity of the seed pattern 150 and the first magnetic pattern MP1 may be deteriorated, and thus resistance characteristics and switching distribution of the magnetic tunnel junction pattern MTJ may be deteriorated.

According to the inventive concepts, the blocking pattern 120, the metal oxide pattern 130 and the buffer pattern 140 may be disposed between the lower electrode BE and the seed pattern 150. The blocking pattern 120 and the metal oxide pattern 130 may have the amorphous phase. When a high-temperature process of 400° C. or more is performed on the magnetic tunnel junction pattern MTJ, the metal oxide pattern 130 may maintain the amorphous phase even though at least a portion of the blocking pattern 120 is crystallized, and thus it is possible to inhibit/prevent the crystal structure of the lower electrode BE from being transferred to the seed pattern 150. The buffer pattern 140 may have the crystalline phase and may increase the crystallinity of the seed pattern 150. Thus, deterioration of the crystallinity of the first magnetic pattern MP1 may be inhibited/prevented.

In addition, the oxide formation energy of the third non-magnetic metal of the metal oxide pattern 130 may be lower than the oxide formation energy of the first non-magnetic metal of the lower electrode BE, the oxide formation energy of the second non-magnetic metal of the blocking pattern 120 and the oxide formation energy of the fourth non-magnetic metal of the buffer pattern 140. In other words, the third non-magnetic metal may more easily react with oxygen than the first, second and fourth non-magnetic metals and may have high reactivity to oxygen. Thus, it is possible to inhibit oxygen in the metal oxide pattern 130 from being diffused into adjacent layers during a high-temperature process.

As a result, resistance characteristics and switching distribution of the magnetic tunnel junction pattern MTJ may be improved, and high-temperature reliability of a magnetic memory device including the magnetic tunnel junction pattern MTJ may be improved.

Figure 3:
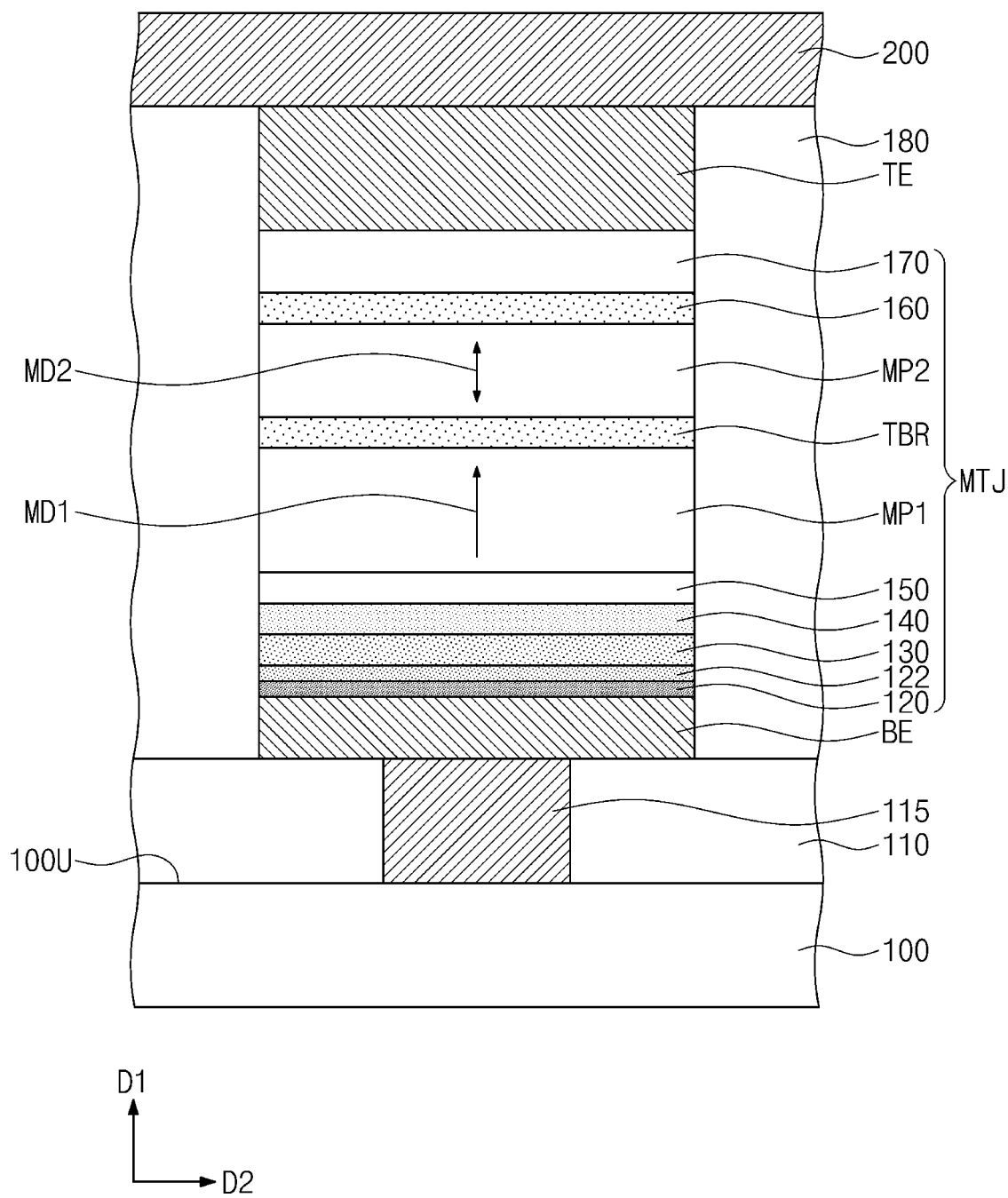
FIG. 3 is a cross-sectional view illustrating a magnetic memory device according to some embodiments of the inventive concepts.

FIG. 3 is a cross-sectional view illustrating a magnetic memory device according to some embodiments of the inventive concepts. Hereinafter, differences between FIG. 3 and FIG. 2 will be mainly described, for the purpose of ease and convenience in explanation.

Referring to FIG. 3, the magnetic tunnel junction pattern MTJ may further include an interfacial oxide pattern 122 between the blocking pattern 120 and the metal oxide pattern 130.

The interfacial oxide pattern 122 may include the same element as the blocking pattern 120 and may further include oxygen. The interfacial oxide pattern 122 may include at least one of the second non-magnetic metal or boron and may further include oxygen. For example, the interfacial oxide pattern 122 may include an oxide of the second non-magnetic metal. An upper portion of the blocking pattern 120 may be oxidized to form the interfacial oxide pattern 122.

Figure 4:
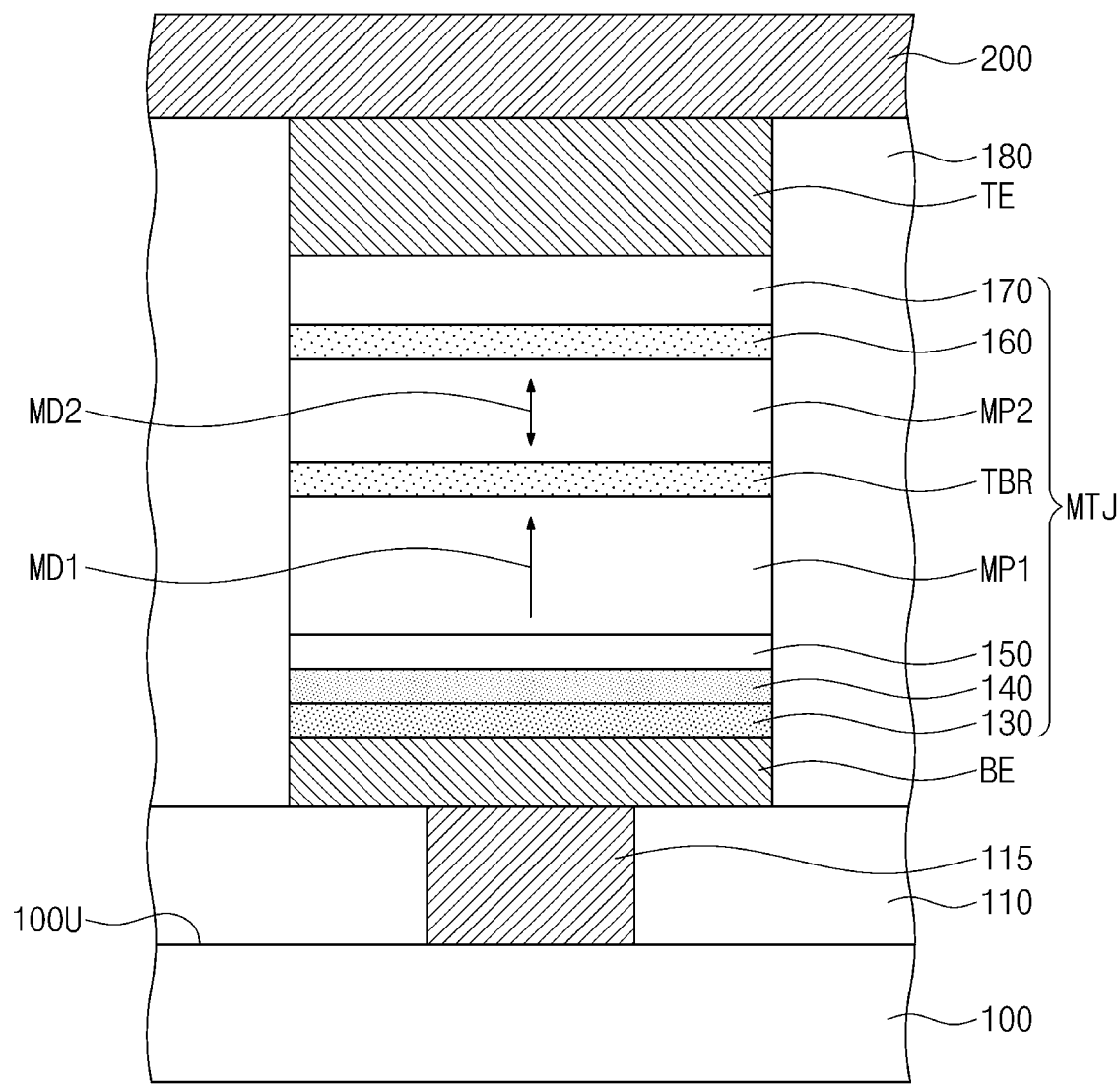
FIG. 4 is a cross-sectional view illustrating a magnetic memory device according to some embodiments of the inventive concepts.

FIG. 4 is a cross-sectional view illustrating a magnetic memory device according to some embodiments of the inventive concepts. Hereinafter, differences between FIG. 4 and FIG. 2 will be mainly described, for the purpose of ease and convenience in explanation.

Referring to FIG. 4, according to some embodiments, the blocking pattern 120 may be omitted. In this case, the magnetic tunnel junction pattern MTJ may include the first magnetic pattern MP1, the second magnetic pattern MP2, the tunnel barrier pattern TBR between the first magnetic pattern MP1 and the second magnetic pattern MP2, the metal oxide pattern 130 between the lower electrode BE and the first magnetic pattern MP1, the buffer pattern 140 between the metal oxide pattern 130 and the first magnetic pattern MP1, the seed pattern 150 between the buffer pattern 140 and the first magnetic pattern MP1, the capping pattern 170 between the second magnetic pattern MP2 and the upper electrode TE, and the non-magnetic pattern 160 between the second magnetic pattern MP2 and the capping pattern 170.

According to some embodiments, the metal oxide pattern 130 may have the amorphous phase and may inhibit/prevent the crystal structure of the lower electrode BE from being transferred to the seed pattern 150. The buffer pattern 140 may have the crystalline phase and may increase the crystallinity of the seed pattern 150. Thus, deterioration of the crystallinity of the first magnetic pattern MP1 may be inhibited/prevented.

In addition, the oxide formation energy of the third non-magnetic metal of the metal oxide pattern 130 may be lower than the oxide formation energy of the first non-magnetic metal of the lower electrode BE and the oxide formation energy of the fourth non-magnetic metal of the buffer pattern 140. In other words, the third non-magnetic metal may more easily react with oxygen than the first non-magnetic metal and the fourth non-magnetic metal and may have high reactivity to oxygen. Thus, it is possible to inhibit oxygen in the metal oxide pattern 130 from being diffused into adjacent layers during a subsequent high-temperature process.

As a result, deterioration of resistance characteristics and switching distribution of the magnetic tunnel junction pattern MTJ may be reduced/minimized, and high-temperature reliability of a magnetic memory device including the magnetic tunnel junction pattern MTJ may be improved.

Figure 5:
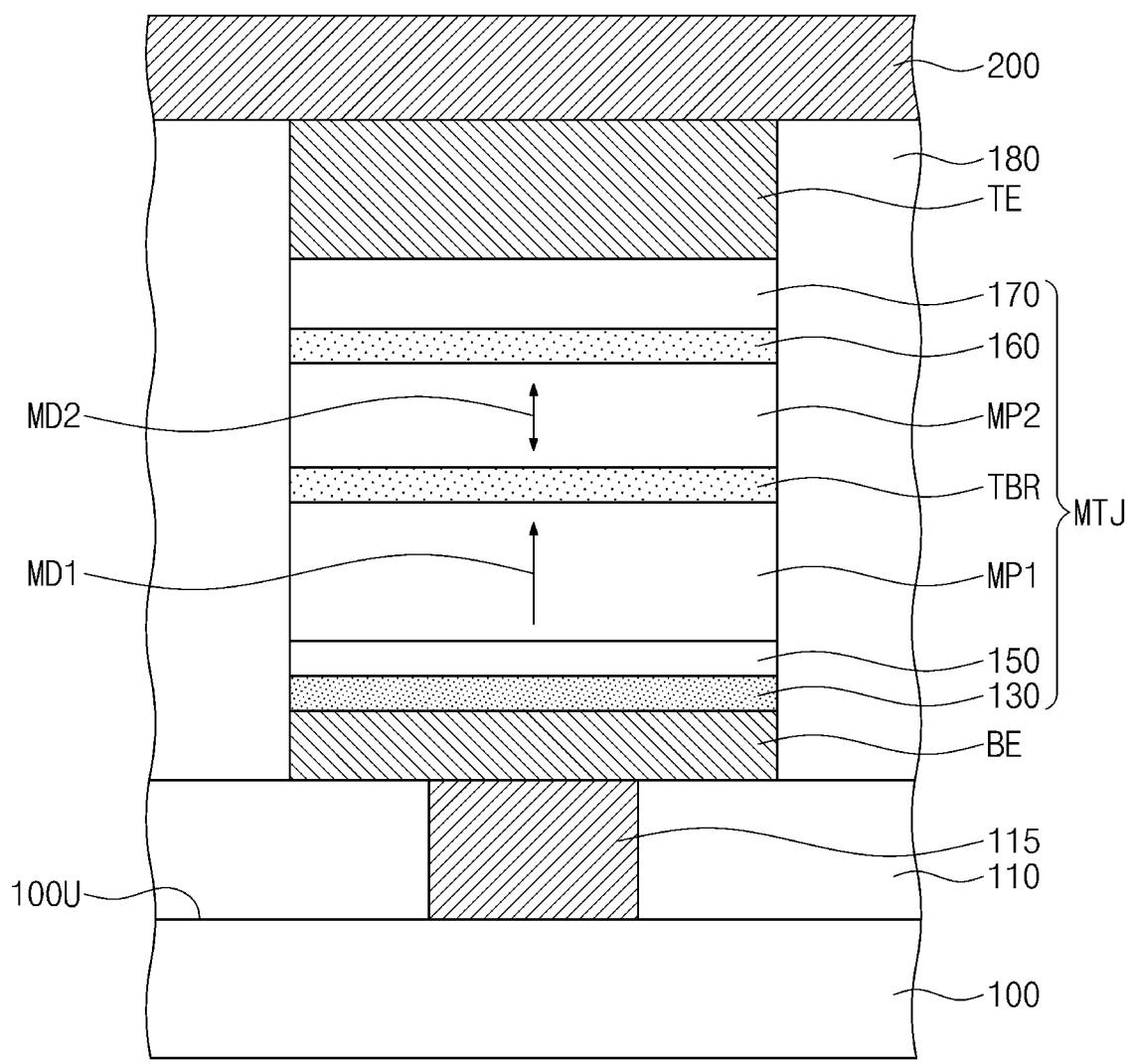
FIG. 5 is a cross-sectional view illustrating a magnetic memory device according to some embodiments of the inventive concepts.

FIG. 5 is a cross-sectional view illustrating a magnetic memory device according to some embodiments of the inventive concepts. Hereinafter, differences between FIG. 5 and FIG. 2 will be mainly described, for the purpose of ease and convenience in explanation.

Referring to FIG. 5, according to some embodiments, the blocking pattern 120 and the buffer pattern 140 may be omitted. In this case, the magnetic tunnel junction pattern MTJ may include the first magnetic pattern MP1, the second magnetic pattern MP2, the tunnel barrier pattern TBR between the first magnetic pattern MP1 and the second magnetic pattern MP2, the metal oxide pattern 130 between the lower electrode BE and the first magnetic pattern MP1, the seed pattern 150 between the metal oxide pattern 130 and the first magnetic pattern MP1, the capping pattern 170 between the second magnetic pattern MP2 and the upper electrode TE, and the non-magnetic pattern 160 between the second magnetic pattern MP2 and the capping pattern 170.

According to the present embodiments, the metal oxide pattern 130 may have the amorphous phase and may inhibit/prevent the crystal structure of the lower electrode BE from being transferred to the seed pattern 150. In addition, the oxide formation energy of the third non-magnetic metal of the metal oxide pattern 130 may be lower than the oxide formation energy of the first non-magnetic metal of the lower electrode BE and may be lower than an oxide formation energy of a metal (e.g., a fifth non-magnetic metal) in the seed pattern 150. In other words, the third non-magnetic metal may more easily react with oxygen than the first non-magnetic metal and the metal in the seed pattern 150 and may have high reactivity to oxygen. Thus, it is possible to inhibit oxygen in the metal oxide pattern 130 from being diffused into adjacent layers during a subsequent high-temperature process. As a result, deterioration of resistance characteristics and switching distribution of the magnetic tunnel junction pattern MTJ may be reduced/minimized, and high-temperature reliability of a magnetic memory device including the magnetic tunnel junction pattern MTJ may be improved.

FIGS. 6 to 10 are cross-sectional views illustrating a method of manufacturing a magnetic memory device according to some embodiments of the inventive concepts. Hereinafter, the descriptions to the same features as mentioned with reference to FIGS. 2 to 5 will be omitted for the purpose of ease and convenience in explanation.

Figure 6:
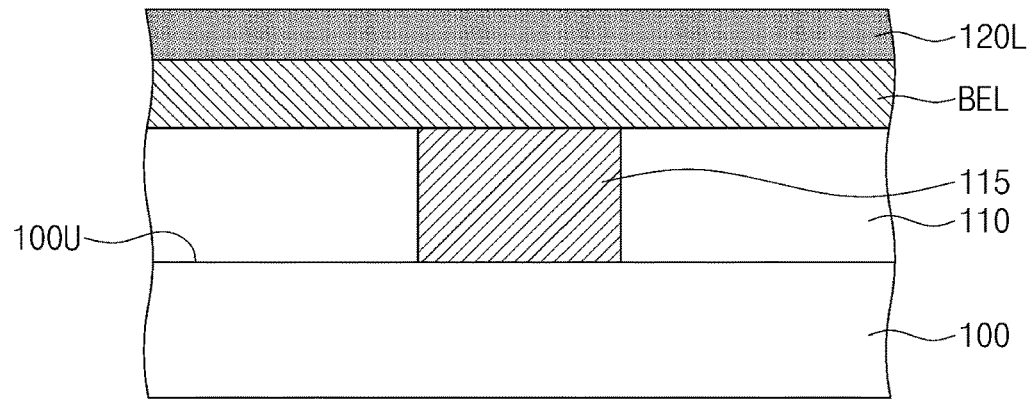
FIGS. 6 to 10 are cross-sectional views illustrating a method of manufacturing a magnetic memory device according to some embodiments of the inventive concepts.

Referring to FIG. 6, a first interlayer insulating layer 110 may be formed on a substrate 100, and a lower contact plug 115 may be formed in the first interlayer insulating layer 110. The lower contact plug 115 may be formed to extend through (e.g., penetrate) the first interlayer insulating layer 110 and may be electrically connected to one terminal (e.g., a source/drain terminal) of a selection element (e.g., the selection element SE of FIG. 1) in the substrate 100.

A lower electrode layer BEL and a blocking layer 120L may be sequentially stacked on the first interlayer insulating layer 110. The lower electrode layer BEL may include a first non-magnetic metal and may include a nitride of the first non-magnetic metal. The blocking layer 120L may include a second non-magnetic metal and may include a boride of the second non-magnetic metal. The lower electrode layer BEL and the blocking layer 120L may be formed by a chemical vapor deposition (CVD) method or a physical vapor deposition (PVD) method and may be formed by, for example, a sputtering deposition method.

Figure 7:
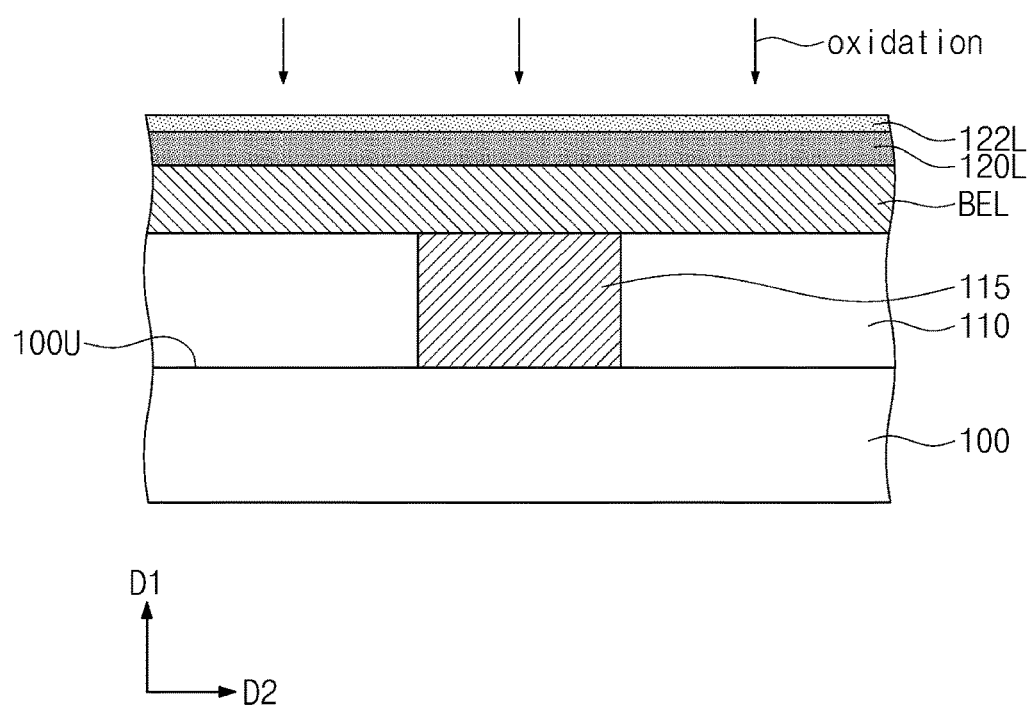

Referring to FIG. 7, an oxidation process may be performed on the blocking layer 120L. An upper portion of the blocking layer 120L may be oxidized by the oxidation process to form an interfacial oxide layer 122L. The interfacial oxide layer 122L may include the same element as the blocking layer 120L and may further include oxygen. The interfacial oxide layer 122L may include at least one of the second non-magnetic metal or boron and may further include oxygen. For example, the interfacial oxide layer 122L may include an oxide of the second non-magnetic metal.

Figure 8:
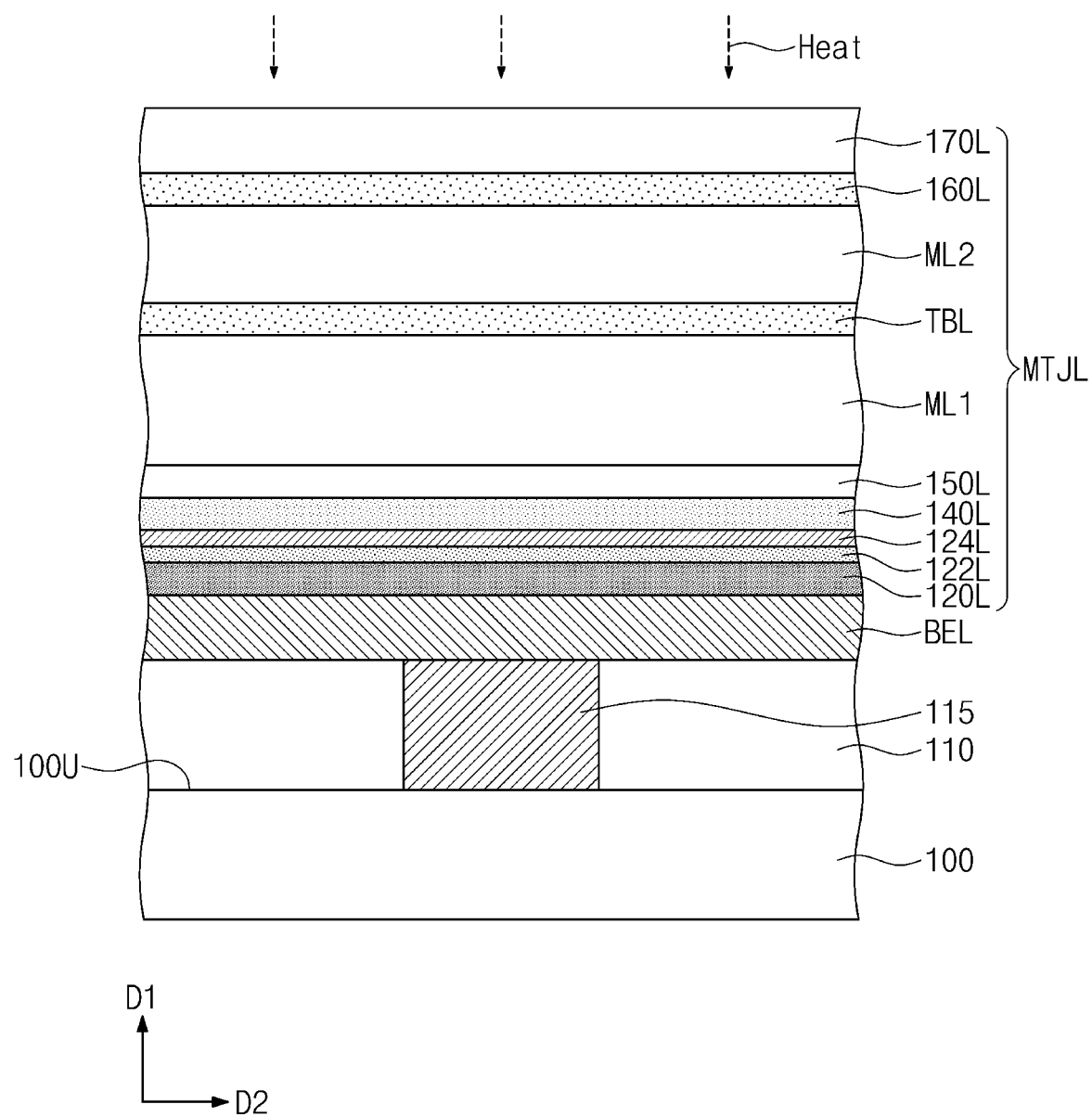

Referring to FIG. 8, a metal layer 124L may be formed on the interfacial oxide layer 122L. The metal layer 124L may include a third non-magnetic metal. The third non-magnetic metal may be different from the first non-magnetic metal and the second non-magnetic metal. An oxide formation energy of the third non-magnetic metal may be lower than an oxide formation energy of the first non-magnetic metal and an oxide formation energy of the second non-magnetic metal.

A buffer layer 140L, a seed layer 150L, a first magnetic layer ML1, a tunnel barrier layer TBL, a second magnetic layer ML2, a non-magnetic layer 160L and a capping layer 170L may be sequentially stacked on the metal layer 124L. The buffer layer 140L may include a fourth non-magnetic metal. The fourth non-magnetic metal may be different from the third non-magnetic metal. An oxide formation energy of the fourth non-magnetic metal may be higher than the oxide formation energy of the third non-magnetic metal. In other words, the oxide formation energy of the third non-magnetic metal may be lower than the oxide formation energy of the fourth non-magnetic metal.

The metal layer 124L, the buffer layer 140L, the seed layer 150L, the first magnetic layer ML1, the tunnel barrier layer TBL, the second magnetic layer ML2, the non-magnetic layer 160L and the capping layer 170L may be formed by a chemical vapor deposition (CVD) method or a physical vapor deposition (PVD) method and may be formed by, for example, a sputtering deposition method.

The blocking layer 120L, the interfacial oxide layer 122L, the metal layer 124L, the buffer layer 140L, the seed layer 150L, the first magnetic layer ML1, the tunnel barrier layer TBL, the second magnetic layer ML2, the non-magnetic layer 160L and the capping layer 170L may constitute a magnetic tunnel junction layer MTJL, and a thermal treatment process may be performed on the magnetic tunnel junction layer MTJL.

Figure 9:
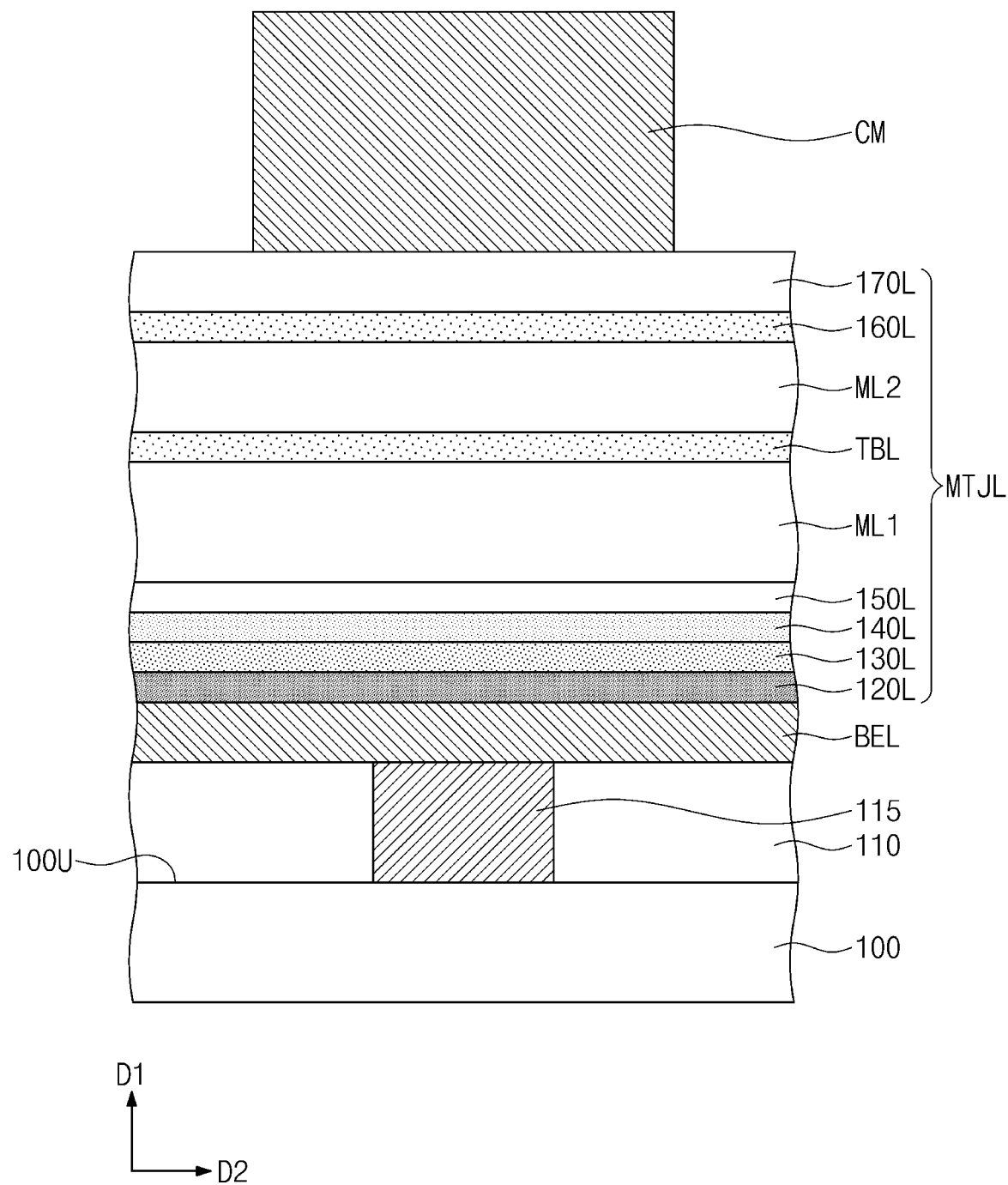

Referring to FIG. 9, the interfacial oxide layer 122L and the metal layer 124L may react with each other by the thermal treatment process, and thus a metal oxide layer 130L may be formed. The metal oxide layer 130L may be disposed between the blocking layer 120L and the buffer layer 140L and may include an oxide of the third non-magnetic metal.

The magnetic tunnel junction layer MTJL may include the blocking layer 120L, the metal oxide layer 130L, the buffer layer 140L, the seed layer 150L, the first magnetic layer ML1, the tunnel barrier layer TBL, the second magnetic layer ML2, the non-magnetic layer 160L and the capping layer 170L, which are sequentially stacked on the lower electrode layer BEL.

A conductive mask pattern CM may be formed on the magnetic tunnel junction layer MTJL and may define a region in which a magnetic tunnel junction pattern to be described later will be formed. The conductive mask pattern CM may include at least one of a metal (e.g., Ta, W, Ru, or Ir) or a conductive metal nitride (e.g., TiN).

Figure 10:
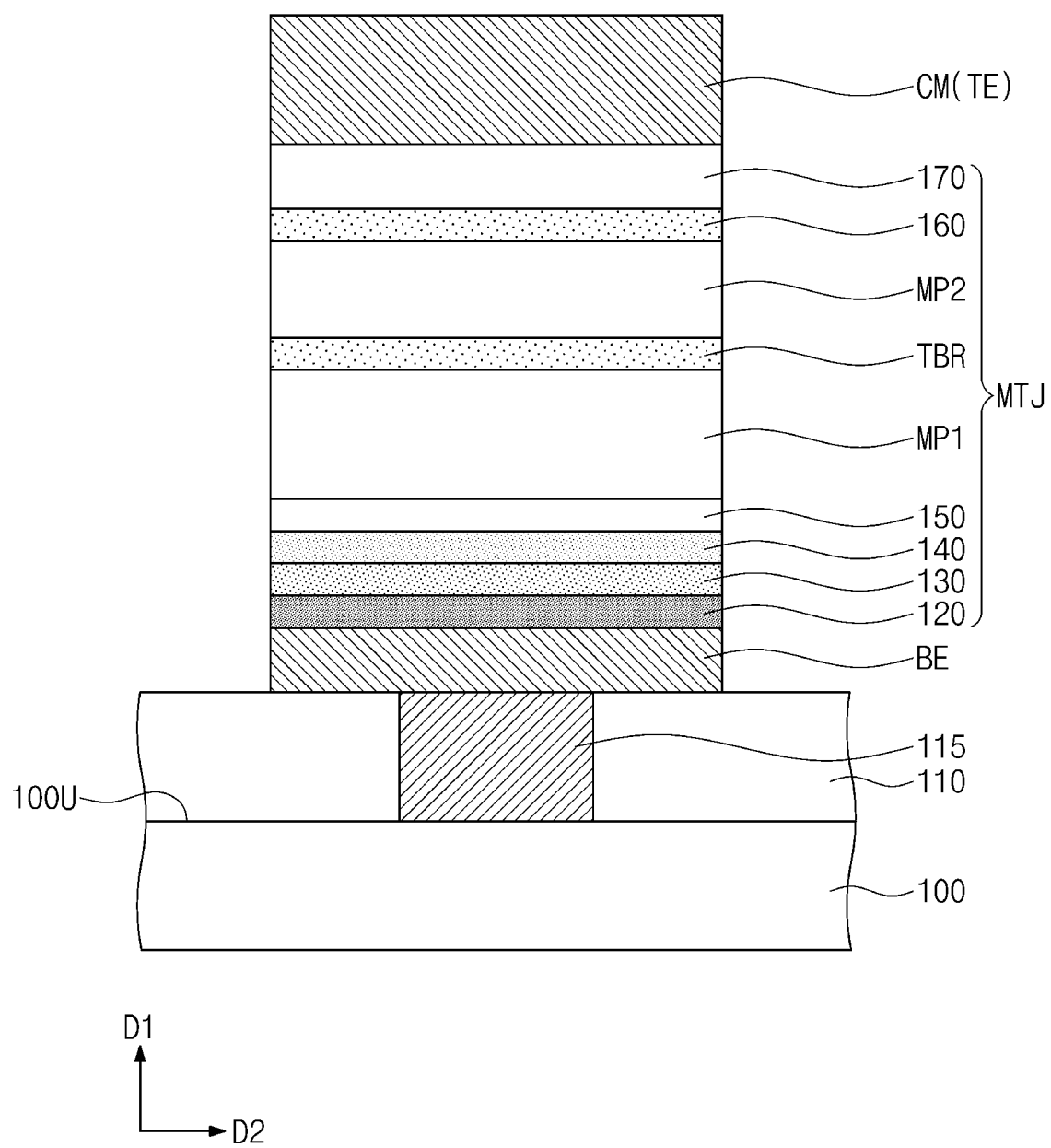

Referring to FIG. 10, an etching process may be performed using the conductive mask pattern CM as an etch mask, and the magnetic tunnel junction layer MTJL may be patterned by the etching process. For example, the etching process may be an ion beam etching process. The lower electrode layer BEL, the blocking layer 120L, the metal oxide layer 130L, the buffer layer 140L, the seed layer 150L, the first magnetic layer ML1, the tunnel barrier layer TBL, the second magnetic layer ML2, the non-magnetic layer 160L and the capping layer 170L may be etched by the etching process, thereby forming a lower electrode BE, a blocking pattern 120, a metal oxide pattern 130, a buffer pattern 140, a seed pattern 150, a first magnetic pattern MP1, a tunnel barrier pattern TBR, a second magnetic pattern MP2, a non-magnetic pattern 160 and a capping pattern 170, respectively. The blocking pattern 120, the metal oxide pattern 130, the buffer pattern 140, the seed pattern 150, the first magnetic pattern MP1, the tunnel barrier pattern TBR, the second magnetic pattern MP2, the non-magnetic pattern 160 and the capping pattern 170 may be sequentially stacked on the lower electrode BE and may constitute a magnetic tunnel junction pattern MTJ.

After the etching process, a portion of the conductive mask pattern CM may remain on the magnetic tunnel junction pattern MTJ. The remaining portion of the conductive mask pattern CM may be used as an upper electrode TE. Though the term "layer" may be used herein with respect to elements that are to be etched using the conductive mask pattern CM as an etch mask (and the term "pattern" may be used herein with respect to portions of those elements that remain after etching), the term "layer" may also be used interchangeably herein with the term "pattern" (and thus may also refer to a remaining portion of an element that has been etched), as a portion of a layer that remains after the etching thereof may still constitute a layer.

Referring again to FIG. 2, a second interlayer insulating layer 180 may be formed on the first interlayer insulating layer 110 and may be on (e.g., may cover) side surfaces of the lower electrode BE, the magnetic tunnel junction pattern MTJ and the upper electrode TE. An upper interconnection line 200 may be formed on the second interlayer insulating layer 180 and may be connected (e.g., electrically connected) to the upper electrode TE. The upper interconnection line 200 may have a line shape extending in the second direction D2.

FIGS. 11 to 14 are cross-sectional views illustrating a method of manufacturing a magnetic memory device according to some embodiments of the inventive concepts. Hereinafter, differences between FIGS. 11-14 and FIGS. 6 to 10 will be mainly described, for the purpose of ease and convenience in explanation.

First, as described with reference to FIG. 6, the first interlayer insulating layer 110 may be formed on the substrate 100, and the lower contact plug 115 may be formed in the first interlayer insulating layer 110. The lower electrode layer BEL and the blocking layer 120L may be sequentially stacked on the first interlayer insulating layer 110.

Figure 11:
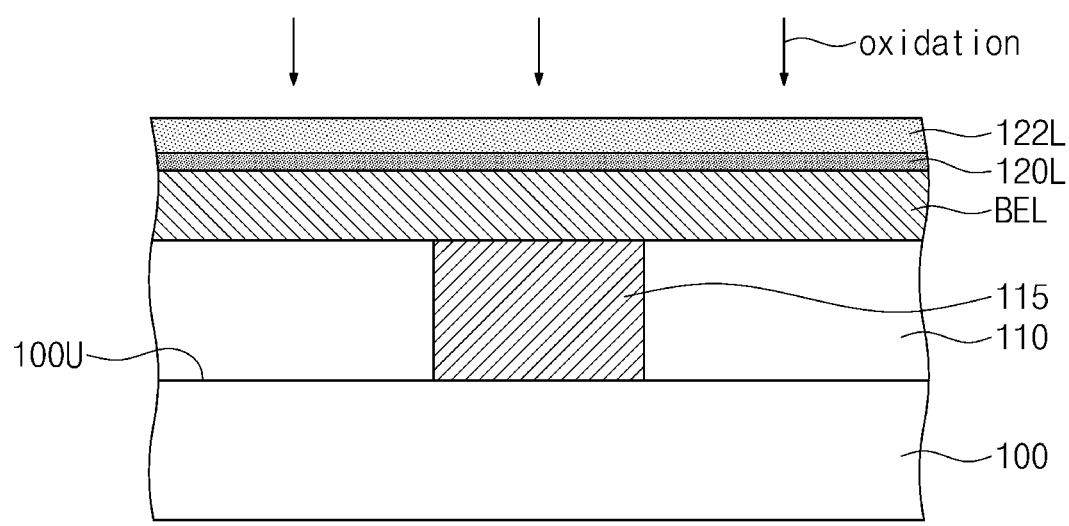
FIGS. 11 to 14 are cross-sectional views illustrating a method of manufacturing a magnetic memory device according to some embodiments of the inventive concepts.

Referring to FIG. 11, the oxidation process may be performed on the blocking layer 120L. An upper portion of the blocking layer 120L may be oxidized by the oxidation process to form the interfacial oxide layer 122L.

Figure 12:
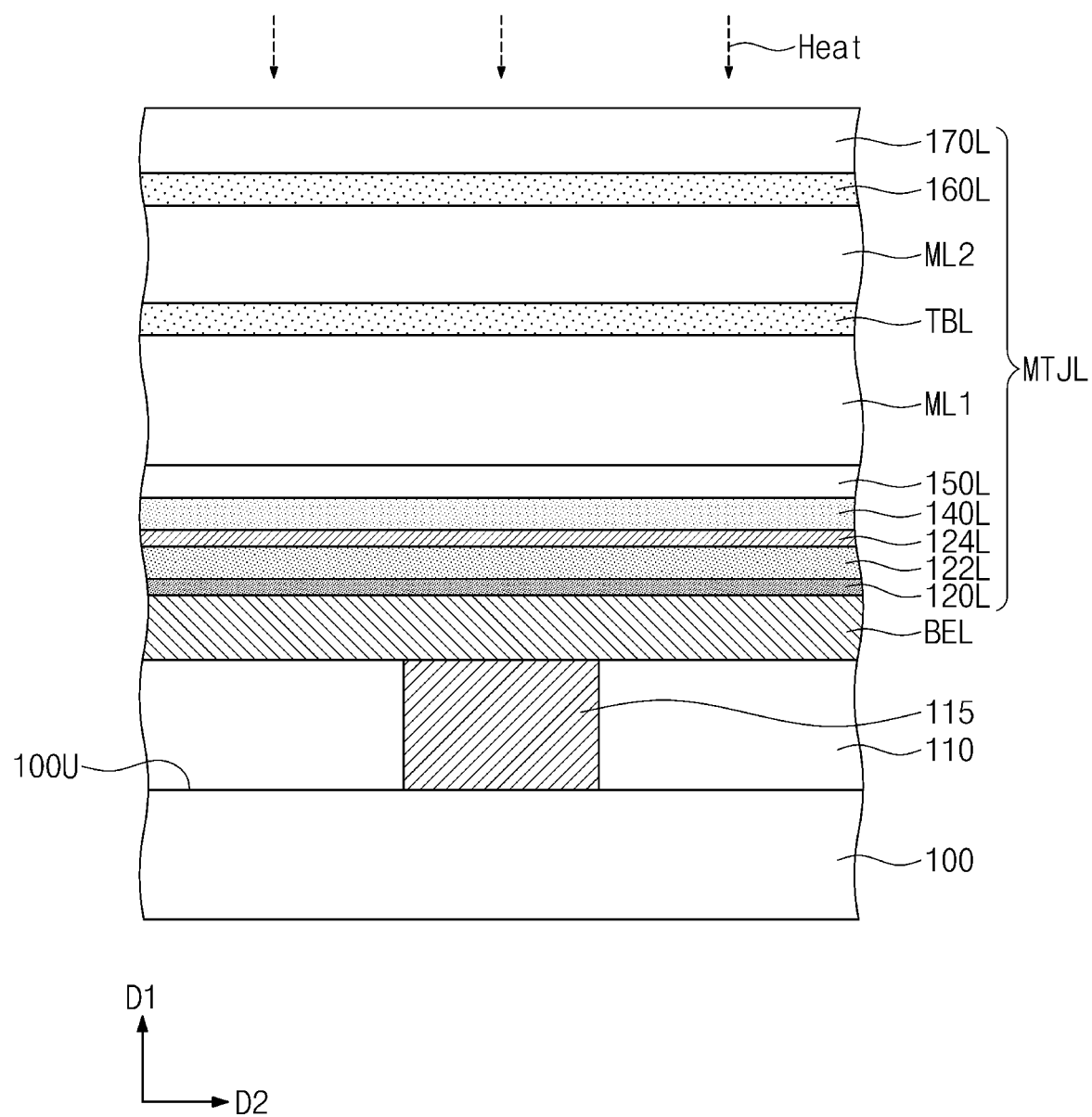

Referring to FIG. 12, the metal layer 124L, the buffer layer 140L, the seed layer 150L, the first magnetic layer ML1, the tunnel barrier layer TBL, the second magnetic layer ML2, the non-magnetic layer 160L and the capping layer 170L may be sequentially stacked on the interfacial oxide layer 122L. The blocking layer 120L, the interfacial oxide layer 122L, the metal layer 124L, the buffer layer 140L, the seed layer 150L, the first magnetic layer ML1, the tunnel barrier layer TBL, the second magnetic layer ML2, the non-magnetic layer 160L and the capping layer 170L may constitute the magnetic tunnel junction layer MTJL, and the thermal (i.e., heat) treatment process may be performed on the magnetic tunnel junction layer MTJL.

Figure 13:
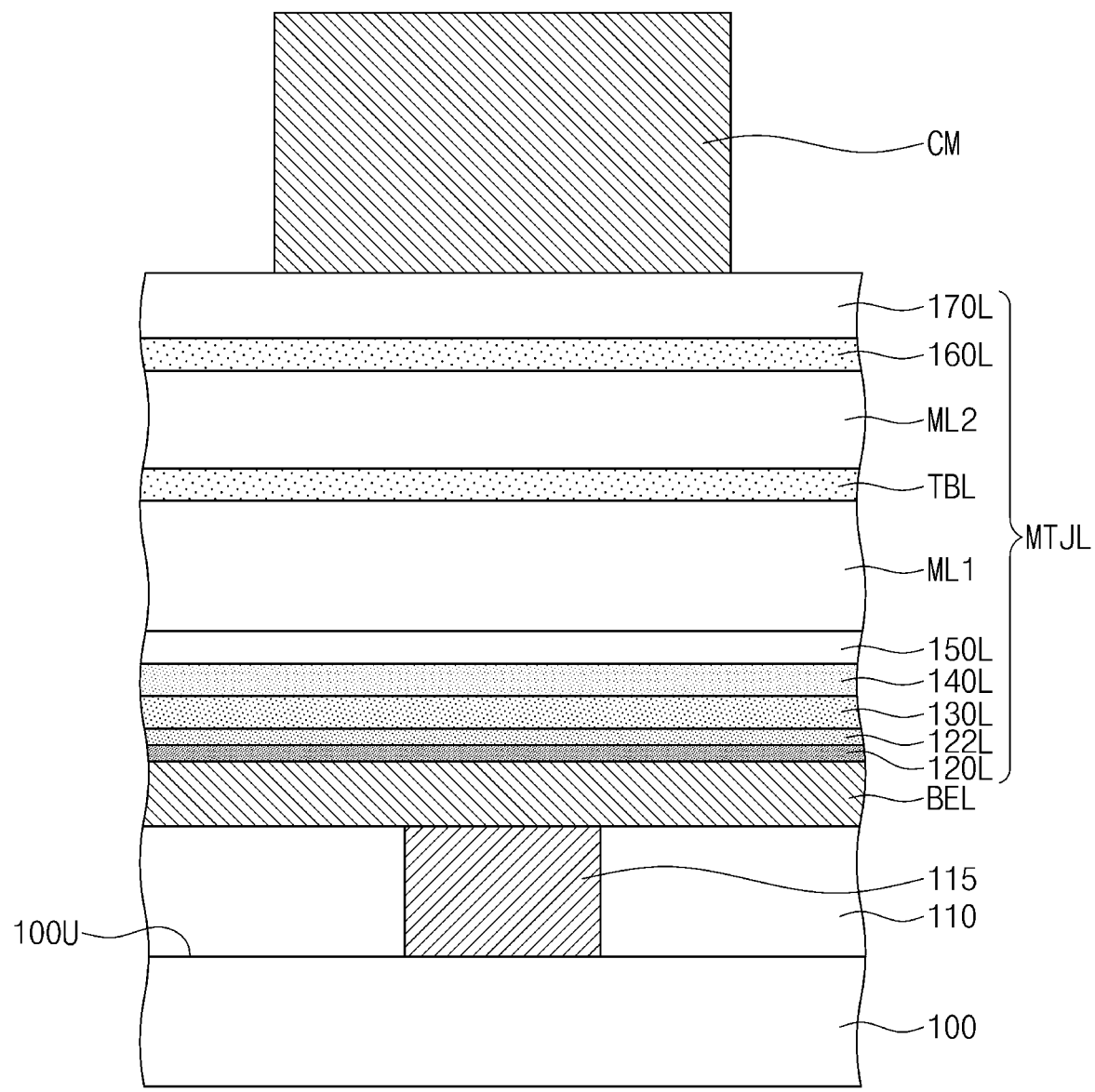

Referring to FIG. 13, an upper portion of the interfacial oxide layer 122L and the metal layer 124L may react with each other by the thermal treatment process, and thus a metal oxide layer 130L may be formed. In some embodiments, a lower portion of the interfacial oxide layer 122L may not react with the metal layer 124L but may remain between the blocking layer 120L and the metal oxide layer 130L. The metal oxide layer 130L may be disposed between the lower portion of the interfacial oxide layer 122L and the buffer layer 140L.

In some embodiments, the magnetic tunnel junction layer MTJL may include the blocking layer 120L, the interfacial oxide layer 122L (i.e., the lower portion of the interfacial oxide layer 122L that does not react with the metal layer 124L), the metal oxide layer 130L, the buffer layer 140L, the seed layer 150L, the first magnetic layer ML1, the tunnel barrier layer TBL, the second magnetic layer ML2, the non-magnetic layer 160L and the capping layer 170L, which are sequentially stacked on the lower electrode layer BEL. The conductive mask pattern CM may be formed on the magnetic tunnel junction layer MTJL.

Figure 14:
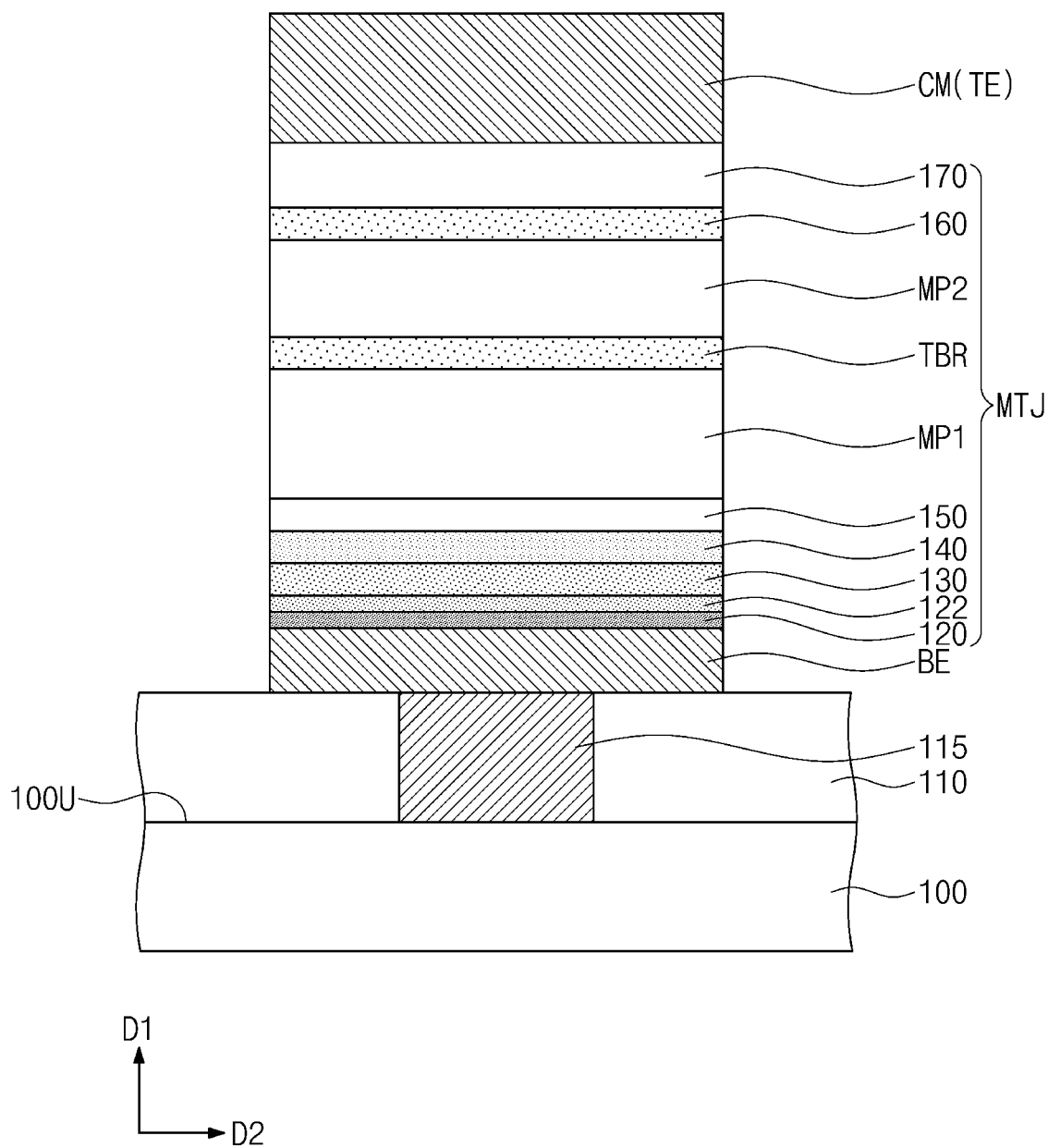

Referring to FIG. 14, the etching process may be performed using the conductive mask pattern CM as an etch mask, and the magnetic tunnel junction layer MTJL may be patterned by the etching process. The lower electrode layer BEL, the blocking layer 120L, the interfacial oxide layer 122L, the metal oxide layer 130L, the buffer layer 140L, the seed layer 150L, the first magnetic layer ML1, the tunnel barrier layer TBL, the second magnetic layer ML2, the non-magnetic layer 160L and the capping layer 170L may be etched by the etching process, thereby forming a lower electrode BE, a blocking pattern 120, an interfacial oxide pattern 122, a metal oxide pattern 130, a buffer pattern 140, a seed pattern 150, a first magnetic pattern MP1, a tunnel barrier pattern TBR, a second magnetic pattern MP2, a non-magnetic pattern 160 and a capping pattern 170, respectively. The blocking pattern 120, the interfacial oxide pattern 122, the metal oxide pattern 130, the buffer pattern 140, the seed pattern 150, the first magnetic pattern MP1, the tunnel barrier pattern TBR, the second magnetic pattern MP2, the non-magnetic pattern 160 and the capping pattern 170 may be sequentially stacked on the lower electrode BE and may constitute a magnetic tunnel junction pattern MTJ.

Subsequent processes may be substantially the same as corresponding processes of the method of manufacturing the magnetic memory device described with reference to FIGS. 6 to 10. The magnetic memory device including the magnetic tunnel junction pattern MTJ described with reference to FIG. 3 may be manufactured by the manufacturing method described above.

FIGS. 15 to 18 are cross-sectional views illustrating a method of manufacturing a magnetic memory device according to some embodiments of the inventive concepts. Hereinafter, differences between FIGS. 15-18 and FIGS. 6 to 10 will be mainly described, for the purpose of ease and convenience in explanation.

Figure 15:
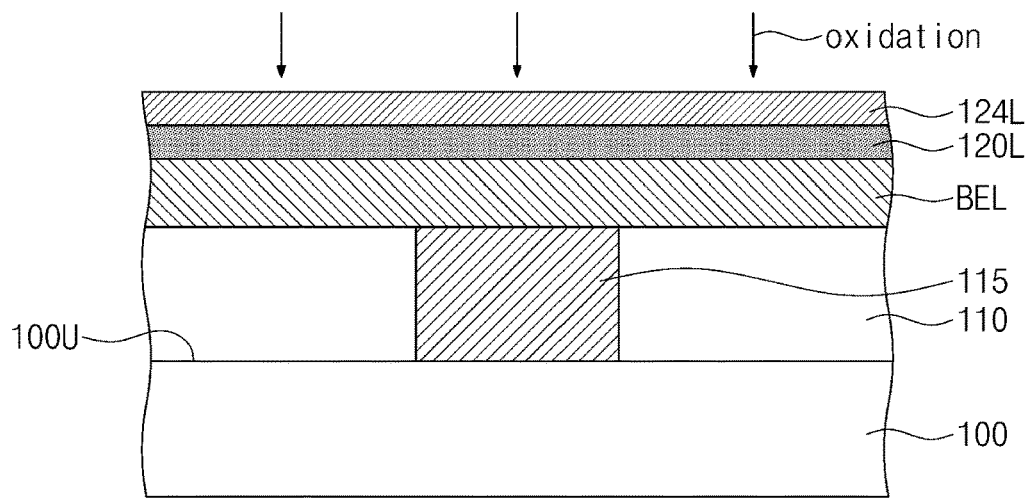
FIGS. 15 to 18 are cross-sectional views illustrating a method of manufacturing a magnetic memory device according to some embodiments of the inventive concepts.
Figure 15:

Referring to FIG. 15, the first interlayer insulating layer 110 may be formed on the substrate 100, and the lower contact plug 115 may be formed in the first interlayer insulating layer 110. The lower electrode layer BEL and the blocking layer 120L may be sequentially stacked on the first interlayer insulating layer 110. The metal layer 124L may be formed on the blocking layer 120L, and an oxidation process may be performed on the metal layer 124L. In certain embodiments, the formation of the blocking layer 120L may be omitted, and in this case, the metal layer 124L may be formed directly on the lower electrode layer BEL.

Figure 16:
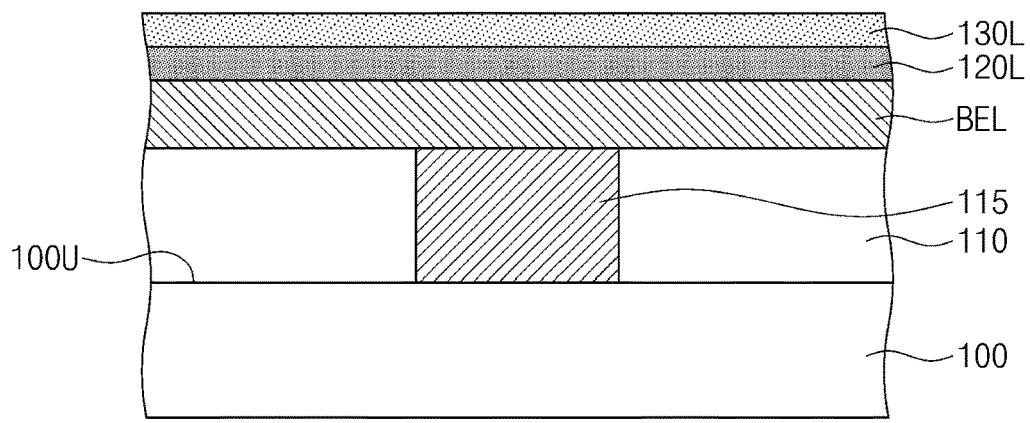
Figure 16:
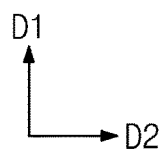

Referring to FIG. 16, the metal layer 124L may be oxidized by the oxidation process to form the metal oxide layer 130L. The blocking layer 120L may be disposed between the lower electrode layer BEL and the metal oxide layer 130L. In certain embodiments, the formation of the blocking layer 120L may be omitted, and in this case, the metal oxide layer 130L may be formed directly on the lower electrode layer BEL.

Figure 17:
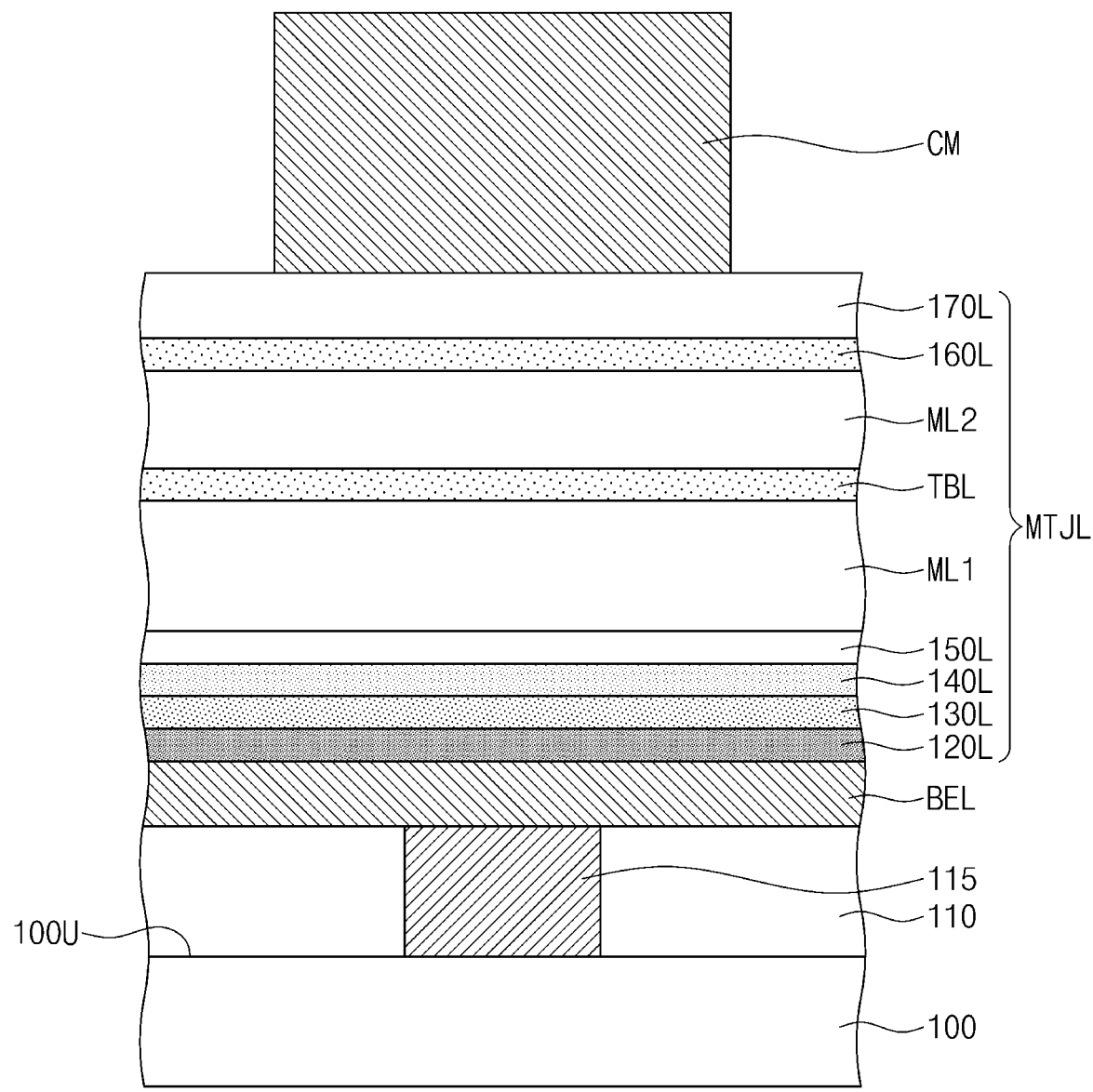

Referring to FIG. 17, the buffer layer 140L, the seed layer 150L, the first magnetic layer ML1, the tunnel barrier layer TBL, the second magnetic layer ML2, the non-magnetic layer 160L and the capping layer 170L may be sequentially stacked on the metal oxide layer 130L. The blocking layer 120L, the metal oxide layer 130L, the buffer layer 140L, the seed layer 150L, the first magnetic layer ML1, the tunnel barrier layer TBL, the second magnetic layer ML2, the non-magnetic layer 160L and the capping layer 170L may constitute the magnetic tunnel junction layer MTJL. The conductive mask pattern CM may be formed on the magnetic tunnel junction layer MTJL. In certain embodiments, the formation of the blocking layer 120L and/or the buffer layer 140L may be omitted.

Figure 18:
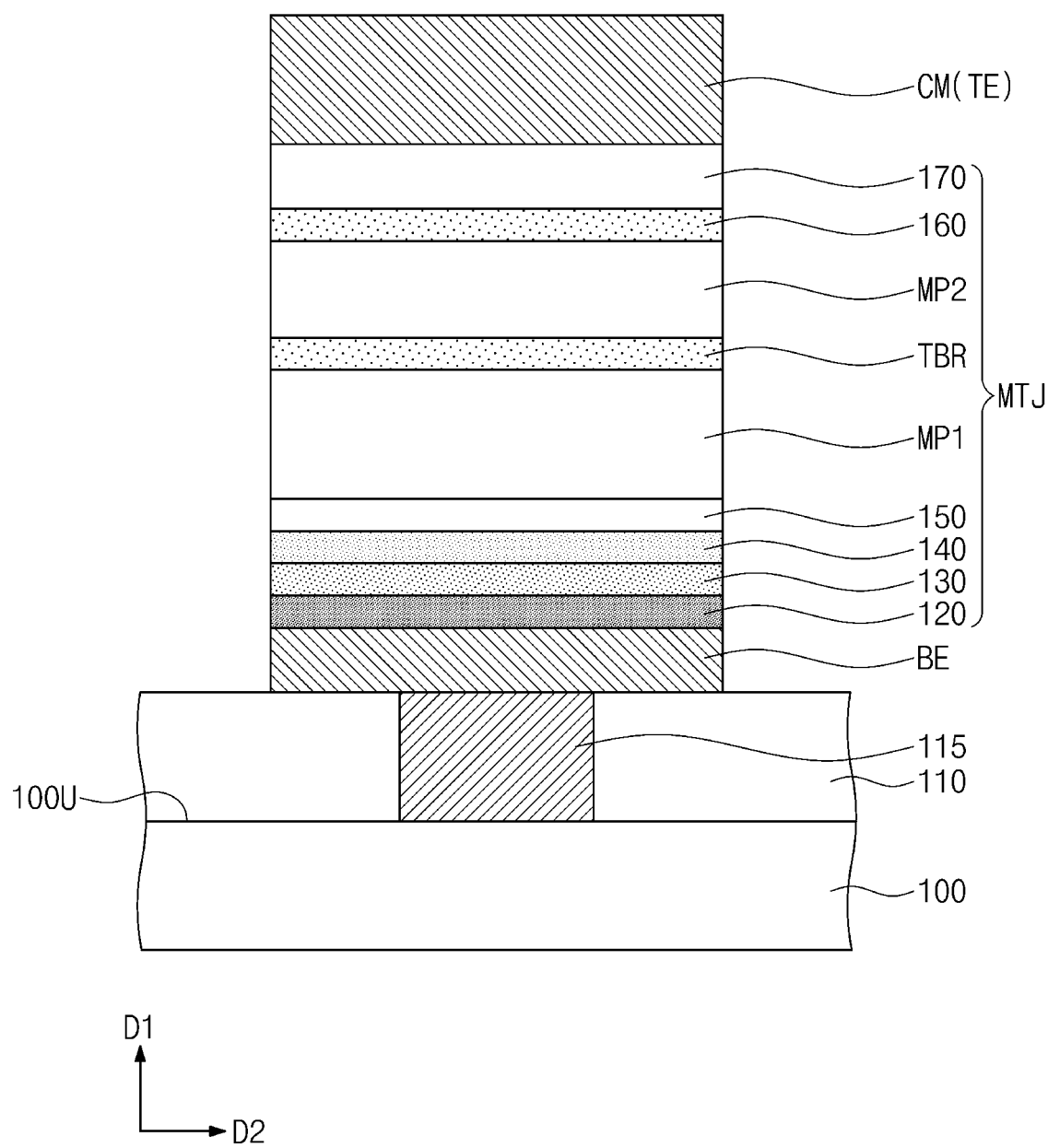

Referring to FIG. 18, the etching process may be performed using the conductive mask pattern CM as an etch mask, and the magnetic tunnel junction layer MTJL may be patterned by the etching process. The lower electrode layer BEL, the blocking layer 120L, the metal oxide layer 130L, the buffer layer 140L, the seed layer 150L, the first magnetic layer ML1, the tunnel barrier layer TBL, the second magnetic layer ML2, the non-magnetic layer 160L and the capping layer 170L may be etched by the etching process, thereby forming a lower electrode BE, a blocking pattern 120, a metal oxide pattern 130, a buffer pattern 140, a seed pattern 150, a first magnetic pattern MP1, a tunnel barrier pattern TBR, a second magnetic pattern MTJ, a non-magnetic pattern 160 and a capping pattern 170, respectively. In certain embodiments, the formation of the blocking layer 120L and/or the buffer layer 140L may be omitted, and thus the formation of the blocking pattern 120 and/or the buffer pattern 140 may be omitted.

Subsequent processes may be substantially the same as corresponding processes of the method of manufacturing the magnetic memory device described with reference to FIGS. 6 to 10. The magnetic memory device including the magnetic tunnel junction pattern MTJ described with reference to FIG. 2, 4 or 5 may be manufactured by the manufacturing method described above.

Figure 19:
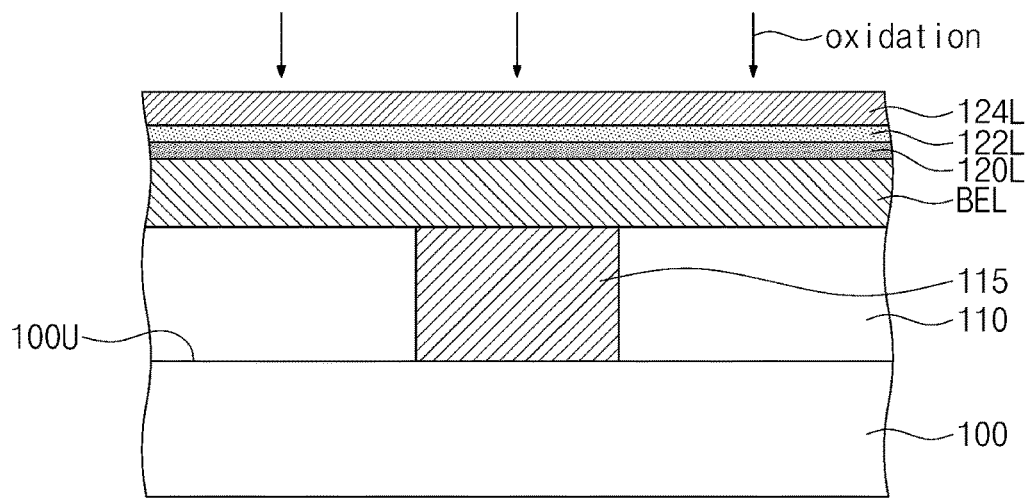
FIGS. 19 and 20 are cross-sectional views illustrating a method of manufacturing a magnetic memory device according to some embodiments of the inventive concepts.
Figure 20:
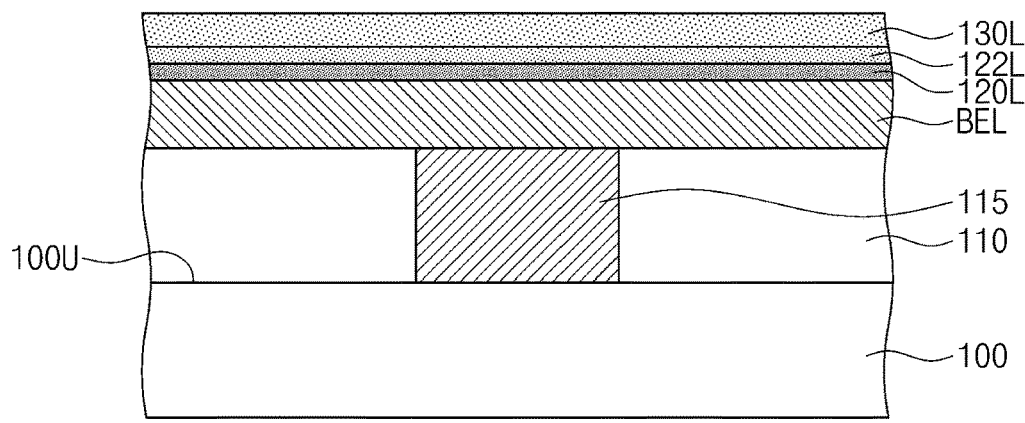

FIGS. 19 and 20 are cross-sectional views illustrating a method of manufacturing a magnetic memory device according to some embodiments of the inventive concepts. Hereinafter, differences between FIGS. 19 and 20 and FIGS. 15 to 18 will be mainly described, for the purpose of ease and convenience in explanation.

Referring to FIG. 19, the first interlayer insulating layer 110 may be formed on the substrate 100, and the lower contact plug 115 may be formed in the first interlayer insulating layer 110. The lower electrode layer BEL and the blocking layer 120L may be sequentially stacked on the first interlayer insulating layer 110. In some embodiments, a first oxidation process may be performed on the blocking layer 120L. An upper portion of the blocking layer 120L may be oxidized by the first oxidation process to form the interfacial oxide layer 122L. The metal layer 124L may be formed on the interfacial oxide layer 122L, and a second oxidation process may be performed on the metal layer 124L.

Referring to FIG. 20, the metal layer 124L may be oxidized by the second oxidation process to form the metal oxide layer 130L. The blocking layer 120L may be disposed between the lower electrode layer BEL and the interfacial oxide layer 122L, and the interfacial oxide layer 122L may be disposed between the blocking layer 120L and the metal oxide layer 130L.

Subsequent processes may be substantially the same as corresponding processes of the method of manufacturing the magnetic memory device described with reference to FIGS. 15 to 18. The magnetic memory device including the magnetic tunnel junction pattern MTJ described with reference to FIG. 3 may be manufactured by the manufacturing method described above.

Figure 21:
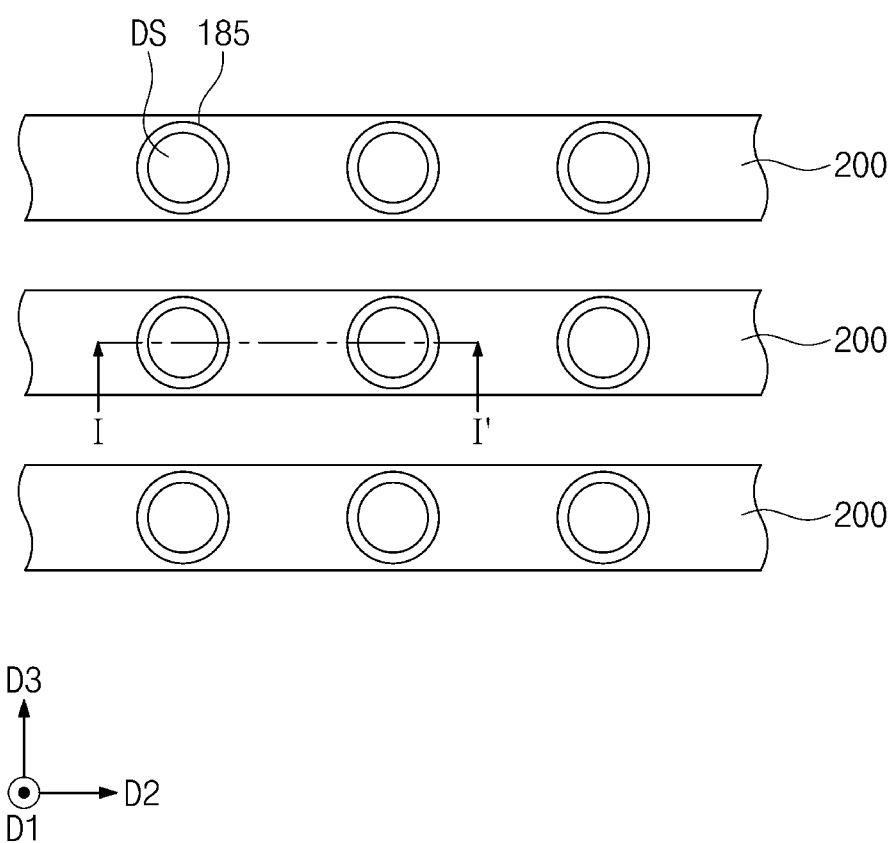
FIG. 21 is a plan view illustrating a magnetic memory device according to some embodiments of the inventive concepts.
Figure 22:
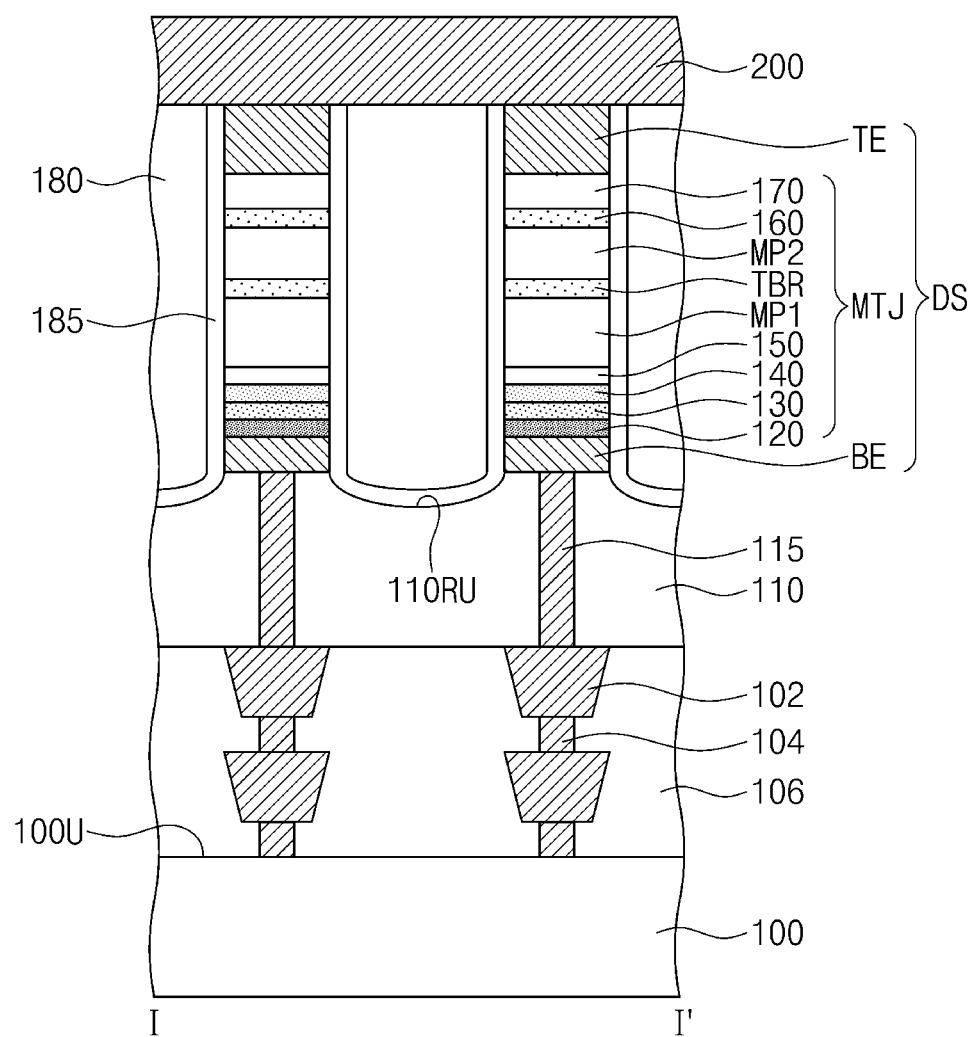
FIG. 22 is a cross-sectional view taken along a line I-I' of FIG. 21.

FIG. 21 is a plan view illustrating a magnetic memory device according to some embodiments of the inventive concepts, and FIG. 22 is a cross-sectional view taken along a line I-I' of FIG. 21. Hereinafter, the descriptions to the same features as mentioned with reference to FIGS. 2 to 5 will be omitted for the purpose of ease and convenience in explanation.

Referring to FIGS. 21 and 22, lower interconnection lines 102 and lower contacts 104 may be disposed on a substrate 100. The lower interconnection lines 102 may be spaced apart from a top surface 100U of the substrate 100 in a first direction D1 perpendicular to the top surface 100U of the substrate 100. The lower contacts 104 may be disposed between the lower interconnection lines 102 and between the substrate 100 and lowermost ones of the lower interconnection lines 102. Each of the lower interconnection lines 102 may be electrically connected to the substrate 100 through a corresponding one of the lower contacts 104. The lower interconnection lines 102 and the lower contacts 104 may include a metal (e.g., copper).

Selection elements (e.g., selection elements SE of FIG. 1) may be disposed in the substrate 100. For example, the selection elements may be field effect transistors. Each of the lower interconnection lines 102 may be electrically connected to one terminal (e.g., a source/drain terminal) of a corresponding one of the selection elements through a corresponding lower contact 104.

A lower interlayer insulating layer 106 may be disposed on the substrate 100 and may cover the lower interconnection lines 102 and the lower contacts 104. Top surfaces of uppermost lower interconnection lines 102 of the lower interconnection lines 102 may be substantially coplanar with a top surface of the lower interlayer insulating layer 106. The top surfaces of the uppermost lower interconnection lines 102 may be located at substantially the same height as the top surface of the lower interlayer insulating layer 106. In the present specification, a height may mean a distance measured from the top surface 100U of the substrate 100 in the first direction D1. For example, the lower interlayer insulating layer 106 may include silicon oxide, silicon nitride, and/or silicon oxynitride.

A first interlayer insulating layer 110 may be disposed on the lower interlayer insulating layer 106 and may cover the top surfaces of the uppermost lower interconnection lines 102.

A plurality of lower contact plugs 115 may be disposed in the first interlayer insulating layer 110. The plurality of lower contact plugs 115 may be spaced apart from each other in a second direction D2 and a third direction D3 which are parallel to the top surface 100U of the substrate 100. The second direction D2 and the third direction D3 may intersect each other. Each of the plurality of lower contact plugs 115 may extend through (e.g., penetrate) the first interlayer insulating layer 110 and may be connected (e.g., electrically connected) to a corresponding one of the lower interconnection lines 102. The plurality of lower contact plugs 115 may include at least one of a doped semiconductor material (e.g., doped silicon), a metal (e.g., tungsten, titanium, and/or tantalum), a metal-semiconductor compound (e.g., a metal silicide), or a conductive metal nitride (e.g., titanium nitride, tantalum nitride, and/or tungsten nitride).

A plurality of data storage patterns DS may be disposed on the first interlayer insulating layer 110 and may be spaced apart from each other in the second direction D2 and the third direction D3. The plurality of data storage patterns DS may be disposed on the plurality of lower contact plugs 115, respectively, and may be connected (e.g., electrically connected) to the plurality of lower contact plugs 115, respectively.

Each of the plurality of data storage patterns DS may include a lower electrode BE, a magnetic tunnel junction pattern MTJ and an upper electrode TE, which are sequentially stacked on a corresponding lower contact plug 115. The lower electrode BE may be disposed between the corresponding lower contact plug 115 and the magnetic tunnel junction pattern MTJ, and the magnetic tunnel junction pattern MTJ may be disposed between the lower electrode BE and the upper electrode TE. The magnetic tunnel junction pattern MTJ shown in FIG. 22 may include the same components as one of the magnetic tunnel junction patterns MTJ described with reference to FIGS. 2 to 5. In some embodiments, as described with reference to FIG. 2, the magnetic tunnel junction pattern MTJ may include a first magnetic pattern MP1, a second magnetic pattern MP2, a tunnel barrier pattern TBR between the first magnetic pattern MP1 and the second magnetic pattern MP2, a blocking pattern 120 between the lower electrode BE and the first magnetic pattern MP1, a metal oxide pattern 130 between the blocking pattern 120 and the first magnetic pattern MP1, a buffer pattern 140 between the metal oxide pattern 130 and the first magnetic pattern MP1, a seed pattern 150 between the buffer pattern 140 and the first magnetic pattern MP1, a capping pattern 170 between the second magnetic pattern MP2 and the upper electrode TE, and a non-magnetic pattern 160 between the second magnetic pattern MP2 and the capping pattern 170. In certain embodiments, as described with reference to FIG. 3, the magnetic tunnel junction pattern MTJ may further include an interfacial oxide pattern 122 between the blocking pattern 120 and the metal oxide pattern 130. In certain embodiments, as described with reference to FIGS. 4 and 5, the blocking pattern 120 and/or the buffer pattern 140 may be omitted.

In some embodiments, a top surface of the first interlayer insulating layer 110 may be recessed toward the substrate 100 between the plurality of data storage patterns DS. A protective insulating layer 185 may surround a side surface of each of the plurality of data storage patterns DS. The protective insulating layer 185 may be on (e.g., may cover) side surfaces of the lower electrode BE, the magnetic tunnel junction pattern MTJ and the upper electrode TE and may surround the side surfaces of the lower electrode BE, the magnetic tunnel junction pattern MTJ and the upper electrode TE when viewed in a plan view. The protective insulating layer 185 may extend from the side surface of each of the plurality of data storage patterns DS onto the recessed top surface 110RU of the first interlayer insulating layer 110. The protective insulating layer 185 may conformally cover the recessed top surface 110RU of the first interlayer insulating layer 110. The protective insulating layer 185 may include a nitride (e.g., silicon nitride).

A second interlayer insulating layer 180 may be disposed on the first interlayer insulating layer 110 and may be on (e.g., may cover) the plurality of data storage patterns DS. The protective insulating layer 185 may be disposed between the side surface of each of the plurality of data storage patterns DS and the second interlayer insulating layer 180 and may extend between the recessed top surface 110RU of the first interlayer insulating layer 110 and the second interlayer insulating layer 180.

A plurality of upper interconnection lines 200 may be disposed on the second interlayer insulating layer 180. The plurality of upper interconnection lines 200 may extend in the second direction D2 and may be spaced apart from each other in the third direction D3. Each of the plurality of upper interconnection lines 200 may be connected (e.g., electrically connected) to data storage patterns DS, spaced apart from each other in the second direction D2, of the plurality of data storage patterns DS.

According to the inventive concepts, the blocking pattern, the metal oxide pattern, and the buffer pattern may be disposed between the lower electrode and the seed pattern. At least a portion of the blocking pattern and the metal oxide pattern may have the amorphous phase. Thus, it is possible to inhibit/prevent the crystal structure of the lower electrode from being transferred to the seed pattern. The buffer pattern may have the crystalline phase and may increase the crystallinity of the seed pattern. Thus, deterioration of the crystallinity of the magnetic pattern in the magnetic tunnel junction pattern may be inhibited/prevented.

In addition, the metal oxide pattern may include a non-magnetic metal having an oxide formation energy lower than those of the non-magnetic metals in the lower electrode, the blocking pattern, and the buffer pattern. In other words, the non-magnetic metal in the metal oxide pattern may more easily react with oxygen than the non-magnetic metals in the lower electrode, the blocking pattern, and the buffer pattern, and may have high reactivity to oxygen. Thus, it is possible to inhibit oxygen in the metal oxide pattern from being diffused into adjacent layers during a subsequent high-temperature process.

As a result, the resistance characteristics and switching distribution of the magnetic tunnel junction pattern may be improved, and the high-temperature reliability of the magnetic memory device including the magnetic tunnel junction pattern may be improved.

While example embodiments of the inventive concepts have been particularly shown and described, it will be understood by one of ordinary skill in the art that variations in form and detail may be made therein without departing from the scope of the attached claims.

What is claimed is:

1. A magnetic memory device comprising:
   a first magnetic pattern and a second magnetic pattern that are sequentially stacked on a substrate;
   a tunnel barrier pattern between the first magnetic pattern and the second magnetic pattern;
   a lower electrode between the substrate and the first magnetic pattern;
   a blocking pattern between the lower electrode and the first magnetic pattern;
   a metal oxide pattern between the blocking pattern and the first magnetic pattern;
   a buffer pattern between the metal oxide pattern and the first magnetic pattern; and
   a seed pattern between the buffer pattern and the first magnetic pattern,
   wherein the lower electrode, the blocking pattern, the metal oxide pattern, the buffer pattern, and the seed pattern include first, second, third, fourth, and fifth non-magnetic metals, respectively,
   wherein at least a portion of the blocking pattern and the metal oxide pattern has an amorphous phase,
   wherein the buffer pattern has a crystalline phase, and
   wherein the blocking pattern, the metal oxide pattern, and the buffer pattern are sequentially stacked between the lower electrode and the seed pattern.

2. The magnetic memory device of claim 1,
   wherein the lower electrode includes a nitride of the first non-magnetic metal,
   wherein the blocking pattern includes a boride of the second non-magnetic metal, and
   wherein the third non-magnetic metal of the metal oxide pattern is different from the first non-magnetic metal and the second non-magnetic metal.

3. The magnetic memory device of claim 2, wherein an oxide formation energy of the third non-magnetic metal is lower than an oxide formation energy of the first non-magnetic metal and an oxide formation energy of the second non-magnetic metal.

4. The magnetic memory device of claim 2, wherein the third non-magnetic metal is different from the fourth non-magnetic metal of the buffer pattern.

5. The magnetic memory device of claim 4, wherein an oxide formation energy of the third non-magnetic metal is lower than an oxide formation energy of the fourth non-magnetic metal.

6. The magnetic memory device of claim 2, wherein the metal oxide pattern includes an oxide of the third non-magnetic metal.

7. The magnetic memory device of claim 2,
   wherein the third non-magnetic metal is different from the fourth non-magnetic metal of the buffer pattern, and
   wherein the fourth non-magnetic metal comprises at least one of tantalum (Ta), tungsten (W), niobium (Nb), chromium (Cr), molybdenum (Mo), aluminum (Al), ruthenium (Ru), or vanadium (V).

8. The magnetic memory device of claim 1, further comprising:
   an interfacial oxide pattern between the blocking pattern and the metal oxide pattern,
   wherein the interfacial oxide pattern includes the same element as the blocking pattern and further includes oxygen.

9. The magnetic memory device of claim 1,
   wherein the fifth non-magnetic metal of the seed pattern includes at least one of chromium (Cr), ruthenium (Ru), or iridium (Ir).

10. The magnetic memory device of claim 1, further comprising:
    an upper electrode on the second magnetic pattern;
    a capping pattern between the second magnetic pattern and the upper electrode; and
    a non-magnetic pattern between the second magnetic pattern and the capping pattern,
    wherein the capping pattern includes a non-magnetic metal.

11. A magnetic memory device comprising:
    a first magnetic pattern and a second magnetic pattern that are sequentially stacked on a substrate in a first direction perpendicular to an upper surface of the substrate;
    a tunnel barrier pattern between the first magnetic pattern and the second magnetic pattern;
    a lower electrode between the substrate and the first magnetic pattern;
    a metal oxide pattern between the lower electrode and the first magnetic pattern;
    a buffer pattern between the metal oxide pattern and the first magnetic pattern; and
    a seed pattern between the buffer pattern and the first magnetic pattern,
    wherein the metal oxide pattern, the buffer pattern, and the seed pattern each include a respective non-magnetic metal,
    wherein the metal oxide pattern has an amorphous phase,
    wherein the buffer pattern has a crystalline phase, and
    wherein the metal oxide pattern, the buffer pattern, and the seed pattern are sequentially stacked in the first direction between the lower electrode and the first magnetic pattern.

12. The magnetic memory device of claim 11, further comprising:
    a blocking pattern between the lower electrode and the metal oxide pattern,
    wherein the lower electrode includes a nitride of a first non-magnetic metal, and
    wherein the blocking pattern includes a boride of a second non-magnetic metal.

13. The magnetic memory device of claim 12,
    wherein the non-magnetic metal of the metal oxide pattern is a third non-magnetic metal,
    wherein the metal oxide pattern includes an oxide of the third non-magnetic metal, and
    wherein an oxide formation energy of the third non-magnetic metal is lower than an oxide formation energy of the first non-magnetic metal and an oxide formation energy of the second non-magnetic metal.

14. The magnetic memory device of claim 13,
    wherein the non-magnetic metal of the buffer pattern is a fourth non-magnetic metal, and wherein the oxide formation energy of the third non-magnetic metal is lower than an oxide formation energy of the fourth non-magnetic metal.

15. The magnetic memory device of claim 12, further comprising:
an interfacial oxide pattern between the blocking pattern and the metal oxide pattern,
wherein the interfacial oxide pattern includes at least one of the second non-magnetic metal or boron.

16. A magnetic memory device comprising:
a substrate;
lower and upper electrodes on the substrate, wherein the lower electrode is between the upper electrode and the substrate;
first and second magnetic layers on the substrate, wherein the first magnetic layer is between the lower electrode and the second magnetic layer;
a tunnel barrier layer between the first and second magnetic layers;
a non-crystalline metal oxide layer between the lower electrode and the first magnetic layer;
a blocking layer between the lower electrode and the non-crystalline metal oxide layer, at least a portion of the blocking layer having an amorphous phase; and
a buffer layer between the non-crystalline metal oxide layer and the first magnetic layer, the buffer layer having a crystalline phase.

17. The magnetic memory device of claim 16,
wherein the non-crystalline metal oxide layer comprises a metal that has a lower oxide formation energy than a metal of the blocking layer.

18. The magnetic memory device of claim 16,
wherein the non-crystalline metal oxide layer comprises a metal that has a lower oxide formation energy than a metal of the buffer layer.

19. The magnetic memory device of claim 16, further comprising a seed layer between the buffer layer and the first magnetic layer,
wherein the buffer layer comprises a crystalline layer between the non-crystalline metal oxide layer and the seed layer.

* * * * *